US012684170B2

(12) United States Patent
Hashimoto et al.

(10) Patent No.: US 12,684,170 B2
(45) Date of Patent: Jul. 14, 2026

(54) VIDEO DECODING APPARATUS AND VIDEO CODING APPARATUS

(71) Applicant: Sharp Kabushiki Kaisha, Sakai City (JP)

(72) Inventors: Tomonori Hashimoto, Sakai City (JP); Tomohiro Ikai, Sakai City (JP); Tomoko Aono, Sakai City (JP)

(73) Assignee: SHARP KABUSHIKI KAISHA, Sakai City (JP)

(*) Notice: Subject to any disclaimer, the term of this patent is extended or adjusted under 35 U.S.C. 154(b) by 0 days.

(21) Appl. No.: 18/714,611

(22) PCT Filed: Dec. 1, 2022

(86) PCT No.: PCT/JP2022/044336
§ 371 (c)(1),
(2) Date: May 30, 2024

(87) PCT Pub. No.: WO2023/100970
PCT Pub. Date: Jun. 8, 2023

(65) Prior Publication Data
US 2025/0024078 A1    Jan. 16, 2025

(30) Foreign Application Priority Data
Dec. 3, 2021    (JP) ................................. 2021-196591

(51) Int. Cl.
*H04N 19/60*         (2014.01)
*H04N 19/176*        (2014.01)

(52) U.S. Cl.
CPC ........... *H04N 19/60* (2014.11); *H04N 19/176* (2014.11)

(58) Field of Classification Search
CPC .... H04N 19/60; H04N 19/176; H04N 19/159; H04N 19/1887; H04N 19/91; H04N 19/13; H04N 19/61; H04N 19/70
See application file for complete search history.

(56) References Cited

U.S. PATENT DOCUMENTS

2019/0320204 A1* 10/2019 Chiang ................ H04N 19/157
2021/0321136 A1* 10/2021 Jung ...................... G06T 9/004
(Continued)

FOREIGN PATENT DOCUMENTS

WO        2020/241858 A1    12/2020
WO        2023064689 A1    4/2023

OTHER PUBLICATIONS

Official Communication issued in International Patent Application No. PCT/JP2022/044336, mailed on Feb. 21, 2023.
(Continued)

*Primary Examiner* — Richard T Torrente
(74) *Attorney, Agent, or Firm* — Keating & Bennett, LLP

(57) ABSTRACT

Video coding and decoding apparatuses that can enhance coding efficiency are provided. A video decoding apparatus according to an aspect of the present invention is a video decoding apparatus including a parameter decoder configured to decode, from coded data, syntax (mts_idx) of a target block. The parameter decoder decodes mts_idx depending on a block size, a LAST position, and a non-zero coefficient position of the target block. The parameter decoder determines whether to decode mts_idx, using a threshold for the LAST position. The threshold is larger in a case that the block size is equal to or larger than a prescribed size than in a case that the block size is smaller than the prescribed size.

4 Claims, 17 Drawing Sheets

(56)     References Cited

U.S. PATENT DOCUMENTS

2022/0232255 A1    7/2022  Ikai et al.
2023/0112642 A1*   4/2023  Xu ......................... H04N 19/70
                                                375/240.02

OTHER PUBLICATIONS

Ray et al., "Non-EE2: Adaptive Intra MTS", Joint Video Experts Team (JVET) of ITU-T SG 16 WP 3 and ISO/IEC JTC 1/SC 29, JVET-X0135, Oct. 6-16, 2021, pp. 1-4.
International Telecommunication Union, Series H: Audiovisual and Multimedia Systems Infrastructure of audiovisual services— Coding of moving video, Versatile video coding, ITU-T H.266, Aug. 2020, 515 pages.
Hashimoto et al., "EE2-related: inter MTS refinement on adaptive intra MTS (EE2-4.4)", Joint Vide Experts Team 1 (JVET) of ITU-T SG 16 WP 3 and ISO/IEC JTC 1/SC 29, JVET-Y0159-v2, Jan. 12-21, 2022, 8 pages.

* cited by examiner

| seq_parameter_set_rbsp( ) { | Descriptor |
|---|---|
| sps_seq_parameter_set_id | u(4) |
| sps_video_parameter_set_id | u(4) |
| ... | |
| sps_mts_enabled_flag | |
| if( sps_mts_enabled_flag ) { | |
| sps_explicit_mts_intra_enabled_flag | |
| sps_explicit_mts_inter_enabled_flag | |
| } | |
| ... | |
| } | |

FIG. 9

| coding_unit( x0, y0, cbWidth, cbHeight, cqtDepth, treeType, modeType ) { | Descriptor |
|---|---|
| ... | |
| if( CuPredMode[ chType ][ x0 ][ y0 ] != MODE_INTRA && !pred_mode_plt_flag && general_merge_flag[ x0 ][ y0 ] == 0 ) | |
| cu_coded_flag | ae(v) |
| if( cu_coded_flag ) { | |
| if( CuPredMode[ chType ][ x0 ][ y0 ] == MODE_INTER && sps_sbt_enabled_flag && !ciip_flag[ x0 ][ y0 ] && cbWidth <= MaxTbSizeY && cbHeight <= MaxTbSizeY ) { | |
| allowSbtVerH = cbWidth >= 8 | |
| allowSbtVerQ = cbWidth >= 16 | |
| allowSbtHorH = cbHeight >= 8 | |
| allowSbtHorQ = cbHeight >= 16 | |
| if( allowSbtVerH \|\| allowSbtHorH ) | |
| cu_sbt_flag | ae(v) |
| if( cu_sbt_flag ) { | |
| if( ( allowSbtVerH \|\| allowSbtHorH ) && ( allowSbtVerQ \|\| allowSbtHorQ ) ) | |
| cu_sbt_quad_flag | ae(v) |
| if( ( cu_sbt_quad_flag && allowSbtVerQ && allowSbtHorQ ) \|\| ( !cu_sbt_quad_flag && allowSbtVerH && allowSbtHorH ) ) | |
| cu_sbt_horizontal_flag | ae(v) |
| cu_sbt_pos_flag | ae(v) |
| } | |
| } | |
| ... | |
| LfnstDcOnly = 1 | |
| LfnstZeroOutSigCoeffFlag = 1 | |
| MtsDcOnly = 1 | |
| MtsZeroOutSigCoeffFlag = 1 | |
| transform_tree( x0, y0, cbWidth, cbHeight, treeType, chType ) | |
| lfnstWidth = ( treeType == DUAL_TREE_CHROMA ) ? cbWidth / SubWidthC : ( ( IntraSubPartitionsSplitType == ISP_VER_SPLIT ) ? cbWidth / NumIntraSubPartitions : cbWidth ) | |
| lfnstHeight = ( treeType == DUAL_TREE_CHROMA ) ? cbHeight / SubHeightC : ( ( IntraSubPartitionsSplitType == ISP_HOR_SPLIT ) ? cbHeight / NumIntraSubPartitions : cbHeight ) | |
| lfnstNotTsFlag = ( treeType == DUAL_TREE_CHROMA \|\| !tu_y_coded_flag[ x0 ][ y0 ] \|\| transform_skip_flag[ x0 ][ y0 ][ 0 ] == 0 ) && ( treeType == DUAL_TREE_LUMA \|\| ( ( !tu_cb_coded_flag[ x0 ][ y0 ] \|\| transform_skip_flag[ x0 ][ y0 ][ 1 ] == 0 ) && ( !tu_cr_coded_flag[ x0 ][ y0 ] \|\| transform_skip_flag[ x0 ][ y0 ][ 2 ] == 0 ) ) ) | |
| if( Min( lfnstWidth, lfnstHeight ) >= 4 && sps_lfnst_enabled_flag == 1 && CuPredMode[ chType ][ x0 ][ y0 ] == MODE_INTRA && lfnstNotTsFlag == 1 && ( treeType == DUAL_TREE_CHROMA \|\| !IntraMipFlag[ x0 ][ y0 ] \|\| Min( lfnstWidth, lfnstHeight ) >= 16 ) && Max( cbWidth, cbHeight ) <= MaxTbSizeY ) { | |
| if( ( IntraSubPartitionsSplitType != ISP_NO_SPLIT \|\| LfnstDcOnly == 0 ) && LfnstZeroOutSigCoeffFlag == 1 ) | |
| lfnst_idx | ae(v) |
| } | |
| if( treeType != DUAL_TREE_CHROMA && lfnst_idx == 0 && transform_skip_flag[ x0 ][ y0 ][ 0 ] == 0 && Max( cbWidth, cbHeight ) <= 32 && IntraSubPartitionsSplitType == ISP_NO_SPLIT && cu_sbt_flag == 0 && MtsZeroOutSigCoeffFlag == 1 && MtsDcOnly == 0 ) {          ⎫ | |
| if( ( ( CuPredMode[ chType ][ x0 ][ y0 ] == MODE_INTER && sps_explicit_mts_inter_enabled_flag ) \|\| ( CuPredMode[ chType ][ x0 ][ y0 ] == MODE_INTRA && sps_explicit_mts_intra_enabled_flag ) ) )   ⎬ SYN_CondMts | |
| mts_idx                                                  ⎭ | ae(v) |
| } | |
| } | |
| } | |
| } | |

FIG. 10

Figure 11:
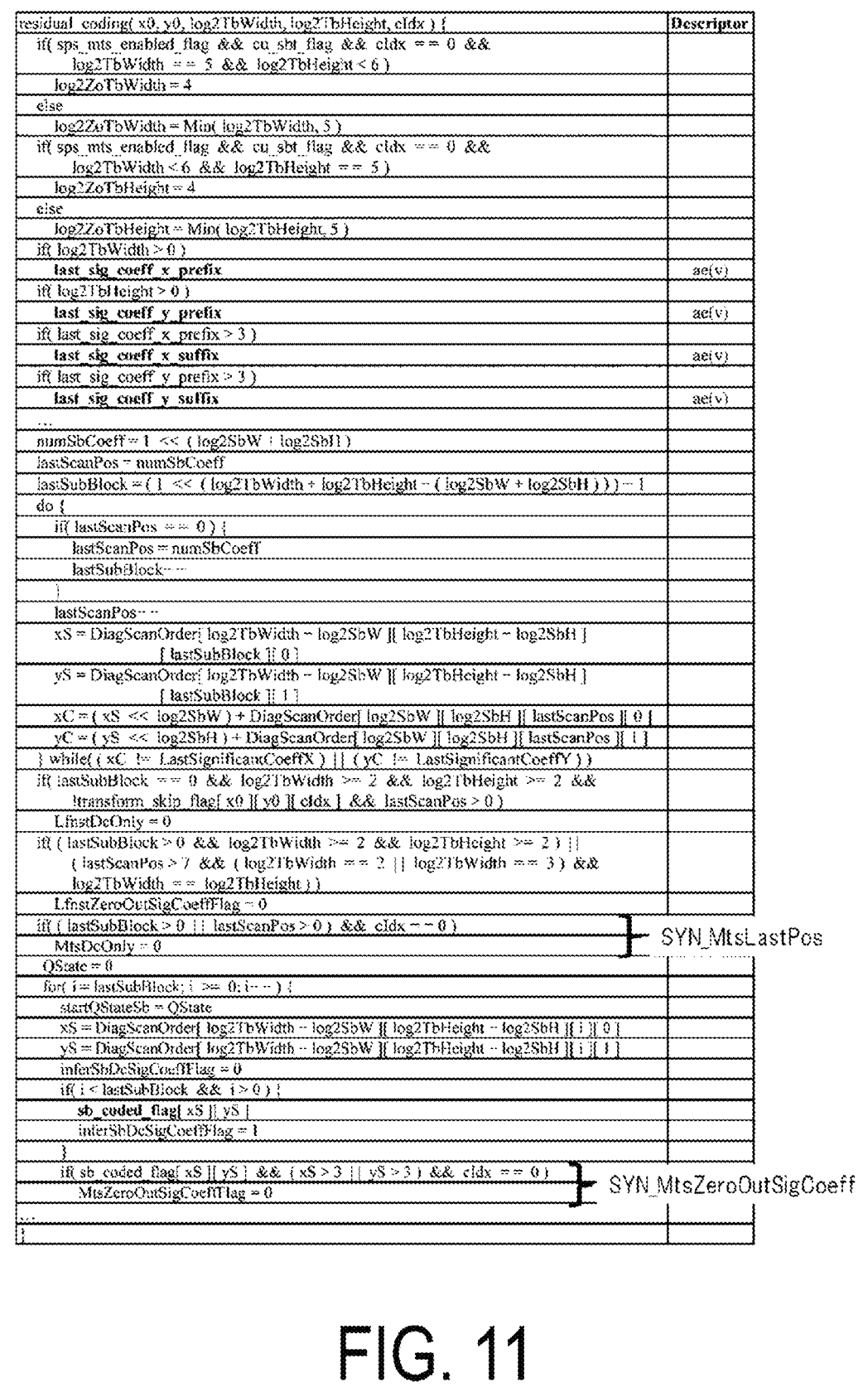

| | Descriptor |
|---|---|
| residual_coding( x0, y0, log2TbWidth, log2TbHeight, cIdx ) { | |
|   if( sps_mts_enabled_flag && cu_sbt_flag && cIdx == 0 && | |
|      log2TbWidth == 5 && log2TbHeight < 6 ) | |
|     log2ZoTbWidth = 4 | |
|   else | |
|     log2ZoTbWidth = Min( log2TbWidth, 5 ) | |
|   if( sps_mts_enabled_flag && cu_sbt_flag && cIdx == 0 && | |
|      log2TbWidth < 6 && log2TbHeight == 5 ) | |
|     log2ZoTbHeight = 4 | |
|   else | |
|     log2ZoTbHeight = Min( log2TbHeight, 5 ) | |
|   if( log2TbWidth > 0 ) | |
|     last_sig_coeff_x_prefix | ae(v) |
|   if( log2TbHeight > 0 ) | |
|     last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   ... | |
|   numSbCoeff = 1 << ( log2SbW + log2SbH ) | |
|   lastScanPos = numSbCoeff | |
|   lastSubBlock = ( 1 << ( log2TbWidth + log2TbHeight − ( log2SbW + log2SbH ) ) ) − 1 | |
|   do { | |
|     if( lastScanPos == 0 ) { | |
|       lastScanPos = numSbCoeff | |
|       lastSubBlock− − | |
|     } | |
|     lastScanPos− − | |
|     xS = DiagScanOrder[ log2TbWidth − log2SbW ][ log2TbHeight − log2SbH ] | |
|         [ lastSubBlock ][ 0 ] | |
|     yS = DiagScanOrder[ log2TbWidth − log2SbW ][ log2TbHeight − log2SbH ] | |
|         [ lastSubBlock ][ 1 ] | |
|     xC = ( xS << log2SbW ) + DiagScanOrder[ log2SbW ][ log2SbH ][ lastScanPos ][ 0 ] | |
|     yC = ( yS << log2SbH ) + DiagScanOrder[ log2SbW ][ log2SbH ][ lastScanPos ][ 1 ] | |
|   } while( ( xC != LastSignificantCoeffX ) || ( yC != LastSignificantCoeffY ) ) | |
|   if( lastSubBlock == 0 && log2TbWidth >= 2 && log2TbHeight >= 2 && | |
|     !transform_skip_flag[ x0 ][ y0 ][ cIdx ] && lastScanPos > 0 ) | |
|     LfnstDcOnly = 0 | |
|   if( ( lastSubBlock > 0 && log2TbWidth >= 2 && log2TbHeight >= 2 ) || | |
|     ( lastScanPos > 7 && ( log2TbWidth == 2 || log2TbWidth == 3 ) && | |
|     log2TbWidth == log2TbHeight ) ) | |
|     LfnstZeroOutSigCoeffFlag = 0 | |
|   if( ( lastSubBlock > 0 || lastScanPos > 0 ) && cIdx == 0 ) | ⎫ SYN_MtsLastPos |
|     MtsDcOnly = 0 | ⎭ |
|   QState = 0 | |
|   for( i = lastSubBlock; i >= 0; i− − ) { | |
|     startQStateSb = QState | |
|     xS = DiagScanOrder[ log2TbWidth − log2SbW ][ log2TbHeight − log2SbH ][ i ][ 0 ] | |
|     yS = DiagScanOrder[ log2TbWidth − log2SbW ][ log2TbHeight − log2SbH ][ i ][ 1 ] | |
|     inferSbDcSigCoeffFlag = 0 | |
|     if( i < lastSubBlock && i > 0 ) { | |
|       sb_coded_flag[ xS ][ yS ] | |
|       inferSbDcSigCoeffFlag = 1 | |
|     } | |
|     if( sb_coded_flag[ xS ][ yS ] && ( xS > 3 || yS > 3 ) && cIdx == 0 ) | ⎫ SYN_MtsZeroOutSigCoeff |
|       MtsZeroOutSigCoeffFlag = 0 | ⎭ |
|   ... | |
| } | |

| mts_idx | 0 | 1 | 2 | 3 | 4 |
|---------|---|---|---|---|---|
| trTypeHor | 0 | 1 | 2 | 1 | 2 |
| trTypeVer | 0 | 1 | 1 | 2 | 2 |

(b)

| cu_sbt_horizontal_flag | cu_sbt_pos_flag | trTypeHor | trTypeVer |
|---|---|---|---|
| 0 | 0 | 2 | 1 |
| 0 | 1 | 1 | 1 |
| 1 | 0 | 1 | 2 |
| 1 | 1 | 1 | 1 |

| coding_unit( x0, y0, cbWidth, cbHeight, cqtDepth, treeType, modeType ) { | Descriptor |
|---|---|
| ... | |
| if( treeType != DUAL_TREE_CHROMA && lfnst_idx == 0 && | |
| transform_skip_flag[ x0 ][ y0 ][ 0 ] == 0 && | |
| (CuPredMode[chType][x0][y0]==MODE_INTRA && Max(cbWidth,cbHeight)<=MAX_MTS_SIZE_INTRA) | |
| \|\| (CuPredMode[chType][x0][y0]==MODE_INTER && Max(cbWidth,cbHeight)<=MAX_MTS_SIZE_INTER)&& | |
| IntraSubPartitionsSplitType == ISP_NO_SPLIT && cu_sbt_flag == 0 && | |
| MtsZeroOutSigCoeffFlag == 1 && MtsDcOnly == 0 ) { | |
| if( ( ( CuPredMode[ chType ][ x0 ][ y0 ] == MODE_INTER && | |
| sps_explicit_mts_inter_enabled_flag ) \|\| | |
| ( CuPredMode[ chType ][ x0 ][ y0 ] == MODE_INTRA && | |
| sps_explicit_mts_intra_enabled_flag ) ) ) | |
| mts_idx | ae(v) |
| } | |
| ... | |
| } | |

SYN_CondMts (b)

| coding_unit( x0, y0, cbWidth, cbHeight, cqtDepth, treeType, modeType ) { | Descriptor |
|---|---|
| ... | |
| if( treeType != DUAL_TREE_CHROMA && lfnst_idx == 0 && | |
| transform_skip_flag[ x0 ][ y0 ][ 0 ] == 0 && | |
| IntraSubPartitionsSplitType == ISP_NO_SPLIT && cu_sbt_flag == 0 && | |
| MtsZeroOutSigCoeffFlag == 1 && MtsDcOnly == 0 ) { | |
| if( ( ( CuPredMode[ chType ][ x0 ][ y0 ] == MODE_INTER && | |
| sps_explicit_mts_inter_enabled_flag && Max(cbWidth,cbHeight) <= MAX_MTS_SIZE_INTER) \|\| | |
| ( CuPredMode[ chType ][ x0 ][ y0 ] == MODE_INTRA && | |
| sps_explicit_mts_intra_enabled_flag && Max(cbWidth,cbHeight) <= MAX_MTS_SIZE_INTRA ) ) ) | |
| mts_idx | ae(v) |
| } | |
| ... | |
| } | |

SYN_CondMts (c)

| residual_coding( x0, y0, log2TbWidth, log2TbHeight, cIdx, chType ) { | Descriptor |
|---|---|
| ... | |
| if(CuPredMode[ chType ][ x0 ][ y0 ] == MODE_INTER && sb_coded_flag[ xS ][ yS ] && | |
| ( xS > 3 \|\| yS > 3 ) && cIdx == 0 ) | |
| MtsZeroOutSigCoeffFlag = 0 | |
| ... | |
| } | |

SYN_MtsZeroOutSigCoeff

| coding_unit( x0, y0, cbWidth, cbHeight, cqtDepth, treeType, modeType ) { | Descriptor |
|---|---|
| ... | |
| if( treeType != DUAL_TREE_CHROMA && lfnst_idx == 0 && transform_skip_flag[ x0 ][ y0 ][ 0 ] == 0 && IntraSubPartitionsSplitType == ISP_NO_SPLIT && cu_sbt_flag == 0 && MtsZeroOutSigCoeffFlag == 1 && MtsDcOnly == 0 ) { | |
| if ( ( ( CuPredMode[ chType ][ x0 ][ y0 ] == MODE_INTER && !ciip_flag[ x0 ][ y0 ] ) && sps_explicit_mts_inter_enabled_flag && Max(cbWidth,cbHeight) <= MAX_MTS_SIZE_INTER) \|\| ( ( CuPredMode[ chType ][ x0 ][ y0 ] == MODE_INTRA \|\| ciip_flag[ x0 ][ y0 ]) && sps_explicit_mts_intra_enabled_flag && Max(cbWidth,cbHeight) <= MAX_MTS_SIZE_INTRA ) ) ) | |
| mts_idx | ae(v) |
| } SYN_CondMts | |
| ... | |
| } | |

(b)

| residual_coding( x0, y0, log2TbWidth, log2TbHeight, cIdx, chType ) { | Descriptor |
|---|---|
| ... | |
| if(CuPredMode[ chType ][ x0 ][ y0 ] == MODE_INTER && !ciip_flag[ x0 ][ y0 ] && sb_coded_flag[ xS ][ yS ] && ( xS > 3 \|\| yS > 3 ) && cIdx == 0 ) | |
| MtsZeroOutSigCoeffFlag = 0 | |
| ... | |
| } SYN_MtsZeroOutSigCoeff | |

(c)

| coding_unit( x0, y0, cbWidth, cbHeight, cqtDepth, treeType, modeType ) { | Descriptor |
|---|---|
| ... | |
| if( treeType != DUAL_TREE_CHROMA && lfnst_idx == 0 && transform_skip_flag[ x0 ][ y0 ][ 0 ] == 0 && IntraSubPartitionsSplitType == ISP_NO_SPLIT && cu_sbt_flag == 0 && MtsZeroOutSigCoeffFlag == 1 && MtsDcOnly == 0 ) { | |
| if ( ( ( CuPredMode[ chType ][ x0 ][ y0 ] == MODE_INTER && !interUseIntra) && sps_explicit_mts_inter_enabled_flag && Max(cbWidth,cbHeight) <= MAX_MTS_SIZE_INTER) \|\| ( ( CuPredMode[ chType ][ x0 ][ y0 ] == MODE_INTRA \|\| interUseIntra) && sps_explicit_mts_intra_enabled_flag && Max(cbWidth,cbHeight) <= MAX_MTS_SIZE_INTRA ) ) ) | |
| mts_idx | ae(v) |
| } SYN_CondMts | |
| ... | |
| } | |

(d)

| residual_coding( x0, y0, log2TbWidth, log2TbHeight, cIdx, chType ) { | Descriptor |
|---|---|
| ... | |
| if(CuPredMode[ chType ][ x0 ][ y0 ] == MODE_INTER && !interUseIntra && sb_coded_flag[ xS ][ yS ] && ( xS > 3 \|\| yS > 3 ) && cIdx == 0 ) | |
| MtsZeroOutSigCoeffFlag = 0 | |
| ... | |
| } SYN_MtsZeroOutSigCoeff | |

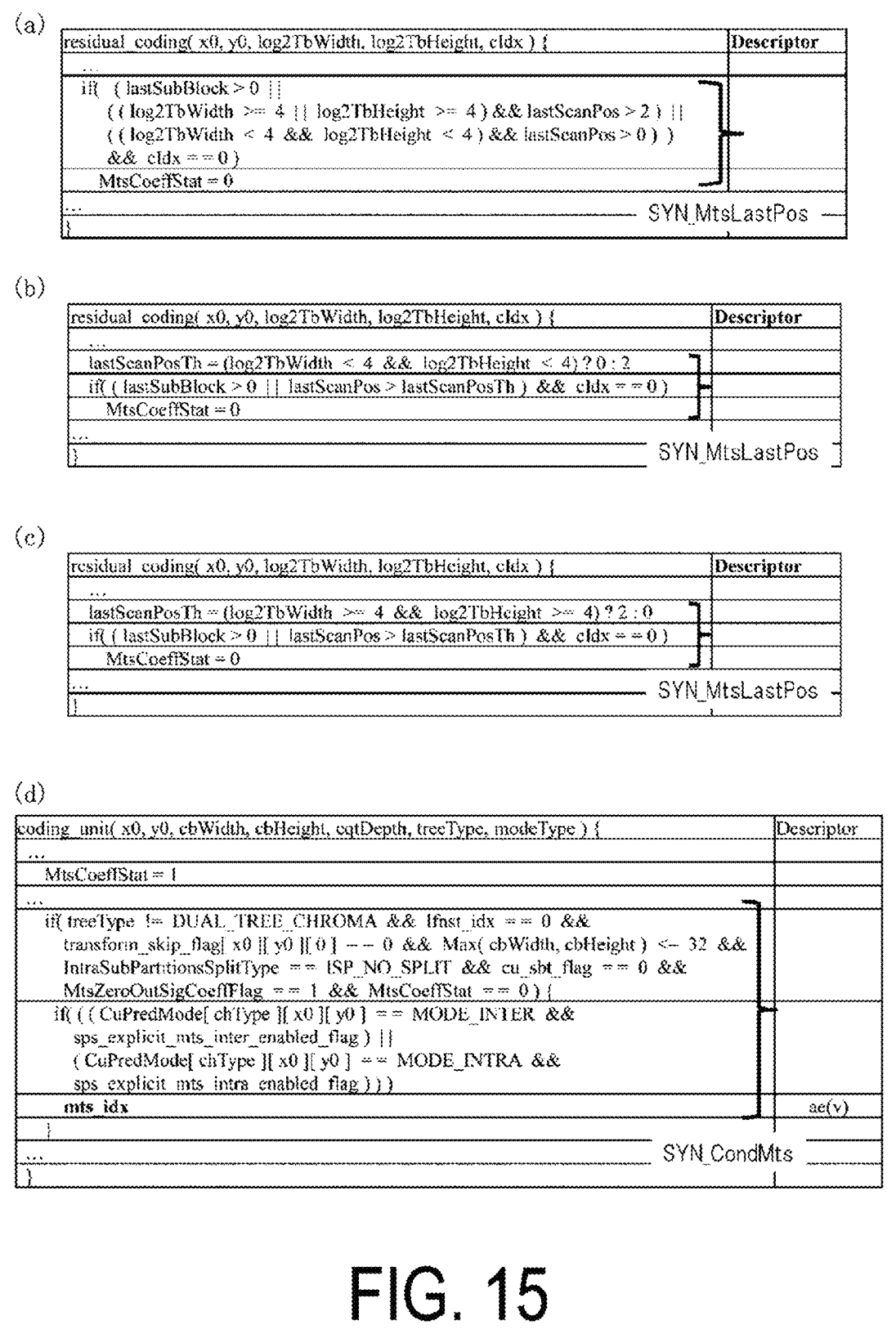

| residual_coding( x0, y0, log2TbWidth, log2TbHeight, cIdx ) { | Descriptor |
|---|---|
| … | |
| if( ( lastSubBlock > 0 \|\| | |
| ( ( log2TbWidth >= 4 \|\| log2TbHeight >= 4 ) && lastScanPos > 2 ) \|\| | |
| ( ( log2TbWidth < 4 && log2TbHeight < 4 ) && lastScanPos > 0 ) ) | |
| && cIdx == 0 ) | |
| MtsCoeffStat = 0 | |
| … ——————————————————— SYN_MtsLastPos —— | |
| } | |

(b)

| residual_coding( x0, y0, log2TbWidth, log2TbHeight, cIdx ) { | Descriptor |
|---|---|
| … | |
| lastScanPosTh = ( log2TbWidth < 4 && log2TbHeight < 4 ) ? 0 : 2 | |
| if( ( lastSubBlock > 0 \|\| lastScanPos > lastScanPosTh ) && cIdx == 0 ) | |
| MtsCoeffStat = 0 | |
| … —————————————————————— SYN_MtsLastPos | |
| } | |

(c)

| residual_coding( x0, y0, log2TbWidth, log2TbHeight, cIdx ) { | Descriptor |
|---|---|
| … | |
| lastScanPosTh = ( log2TbWidth >= 4 && log2TbHeight >= 4 ) ? 2 : 0 | |
| if( ( lastSubBlock > 0 \|\| lastScanPos > lastScanPosTh ) && cIdx == 0 ) | |
| MtsCoeffStat = 0 | |
| … ——————————————————— SYN_MtsLastPos — | |
| } | |

(d)

| coding_unit( x0, y0, cbWidth, cbHeight, cqtDepth, treeType, modeType ) { | Descriptor |
|---|---|
| … | |
| MtsCoeffStat = 1 | |
| … | |
| if( treeType != DUAL_TREE_CHROMA && lfnst_idx == 0 && | |
| transform_skip_flag[ x0 ][ y0 ][ 0 ] == 0 && Max( cbWidth, cbHeight ) <= 32 && | |
| IntraSubPartitionsSplitType == ISP_NO_SPLIT && cu_sbt_flag == 0 && | |
| MtsZeroOutSigCoeffFlag == 1 && MtsCoeffStat == 0 ) { | |
| if( ( ( CuPredMode[ chType ][ x0 ][ y0 ] == MODE_INTER && | |
| sps_explicit_mts_inter_enabled_flag ) \|\| | |
| ( CuPredMode[ chType ][ x0 ][ y0 ] == MODE_INTRA && | |
| sps_explicit_mts_intra_enabled_flag ) ) ) | |
| mts_idx | ae(v) |
| } | |
| … —————————————————————— SYN_CondMts ——————— | |
| } | |

FIG. 15

VIDEO DECODING APPARATUS AND VIDEO CODING APPARATUS

TECHNICAL FIELD

An embodiment of the present invention relates to a video decoding apparatus and a video coding apparatus.

BACKGROUND ART

A video coding apparatus which generates coded data by coding a video, and a video decoding apparatus which generates decoded images by decoding the coded data are used for efficient transmission or recording of videos.

Specific video coding schemes include, for example, H.264/AVC and High-Efficiency Video Coding (HEVC), and the like.

In such a video coding scheme, images (pictures) constituting a video are managed in a hierarchical structure including slices obtained by splitting an image, Coding Tree Units (CTUs) obtained by splitting a slice, units of coding (which may also be referred to as Coding Units (CUs)) obtained by splitting a coding tree unit, and Transform Units (TUs) obtained by splitting a coding unit, and are coded/decoded for each CU.

In such a video coding scheme, a prediction image is usually generated based on a local decoded image that is obtained by coding/decoding an input image (a source image), and prediction errors (which may be referred to also as "difference images" or "residual images") obtained by subtracting the prediction image from the input image are coded. Generation methods of prediction images include inter picture prediction (inter prediction) and intra picture prediction (intra prediction).

NPL 1 discloses a technique referred to as Multiple Transform Selection (MTS) of implicitly switching a transform matrix depending on explicit syntax (mts_idx) in coded data or a block size. NPL 1 also discloses a technique of determining whether the explicit syntax is to be decoded depending on a condition of a transform coefficient such as a LAST position of a non-zero coefficient. NPL 2 discloses a technique of limiting MTS candidates depending on a condition of a transform coefficient, in particular, a LAST position.

CITATION LIST

Non Patent Literature

NPL 1: ITU-T Rec. H.266

NPL 2: "Non-EE2: Adaptive Intra MTS", JVET-X0135, Joint Video Experts Team (JVET) of ITU-T SG 16 WP 3 and ISO/IEC JTC 1/SC 29, 24th Meeting, by teleconference

SUMMARY OF INVENTION

Technical Problem

In the methods described in NPL 1 and NPL 2, a transform matrix is not selected depending on a prediction mode, and thus there is a problem in that coding cannot be performed efficiently. There is a problem in that, although usability of MTS is determined depending on a block size, selection of a transform matrix depending on a condition of a transform coefficient that changes according to the block size is not sufficient.

Solution to Problem

In order to solve the problems described above, a video decoding apparatus according to an aspect of the present invention is a video decoding apparatus including a parameter decoder configured to decode, from coded data, syntax (mts_idx) of a target block. The parameter decoder decodes mts_idx depending on a block size, a LAST position, and a non-zero coefficient position of the target block. The parameter decoder determines whether to decode mts_idx, using a threshold for the LAST position. The threshold is larger in a case that the block size is equal to or larger than a prescribed size than in a case that the block size is smaller than the prescribed size.

Advantageous Effects of Invention

According to one aspect of the present invention, coding efficiency can be improved in video coding/decoding processing.

BRIEF DESCRIPTION OF DRAWINGS

FIG. 9 is a syntax table related to transform in an SPS.

FIG. 10 is a syntax table related to transform in a CU decoder.

FIG. 11 is a syntax table related to MtsDcOnly and MtsZeroOutSigCoeffFlag in an RRC unit.

FIG. 12 shows tables for determining a horizontal transform type and a vertical transform type in MTS and SBT.

FIG. 13 shows other syntax tables related to decoding of mts_idx and derivation of MtsZeroOutSigCoeffFlag.

FIG. 14 shows other syntax tables related to decoding of mts_idx and derivation of MtsZeroOutSigCoeffFlag.

FIG. 15 shows syntax tables related to decoding of mts_idx and derivation of MtsCoeffStat.

DESCRIPTION OF EMBODIMENTS

First Embodiment

Embodiments of the present invention will be described below with reference to the drawings.

Figure 1:
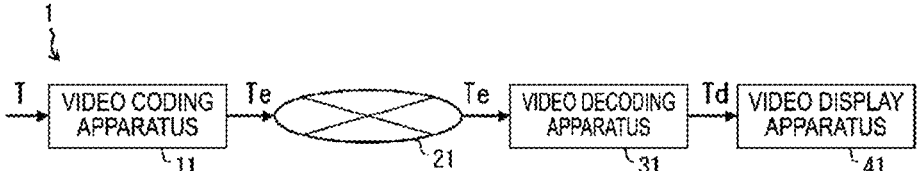
FIG. 1 is a schematic diagram illustrating a configuration of an image transmission system according to the present embodiment.

FIG. 1 is a schematic diagram illustrating a configuration of an image transmission system 1 according to the present embodiment.

The image transmission system 1 is a system in which a coding stream obtained by coding a target image is transmitted, the transmitted coding stream is decoded, and thus an image is displayed. The image transmission system 1 includes a video coding apparatus (image coding apparatus) 11, a network 21, a video decoding apparatus (image decoding apparatus) 31, and a video display apparatus (image display apparatus) 41.

An image T is input to the video coding apparatus 11.

The network 21 transmits a coding stream Te generated by the video coding apparatus 11 to the video decoding apparatus 31. The network 21 is the Internet, a Wide Area Network (WAN), a Local Area Network (LAN), or a combination thereof. The network 21 is not necessarily a bidirectional communication network and may be a unidirectional communication network that transmits broadcast waves for terrestrial digital broadcasting, satellite broadcasting, or the like. The network 21 may be substituted by a storage medium in which the coding stream Te is recorded, such as a Digital Versatile Disc (DVD) (trade name) or a Blue-ray Disc (BD) (trade name).

The video decoding apparatus 31 decodes each of the coding streams Te transmitted from the network 21 and generates one or multiple decoded images Td.

The video display apparatus 41 displays all or part of one or multiple decoded images Td generated by the video decoding apparatus 31. For example, the video display apparatus 41 includes a display device such as a liquid crystal display and an organic Electro-luminescence (EL) display. Examples of display types include stationary, mobile, and HMD. In a case that the video decoding apparatus 31 has a high processing capability, an image having high image quality is displayed, and in a case that the apparatus has a lower processing capability, an image which does not require high processing capability and display capability is displayed.

Operators

Operators used herein will be described below.

">>" is a right bit shift, "<<" is a left bit shift, "&" is a bitwise AND, "|" is a bitwise OR, "|=" is an OR assignment operator, and "||" indicates a logical sum.

x?y:z is a ternary operator that takes y in a case that x is true (other than 0) and takes z in a case that x is false (0).

Clip3(a, b, c) is a function to clip c in a value of a to b, and a function to return a in a case that c is smaller than a (c<a), return b in a case that c is greater than b (c>b), and return c in the other cases (provided that a is smaller than or equal to b (a<=b)).

abs (a) is a function that returns the absolute value of a.

Int (a) is a function that returns the integer value of a.

floor (a) is a function that returns the maximum integer equal to or less than a.

ceil (a) is a function that returns the minimum integer equal to or greater than a.

a/d represents division of a by d (round down decimal places).

Structure of Coding Stream Te

Prior to the detailed description of the video coding apparatus 11 and the video decoding apparatus 31 according to the present embodiment, a data structure of the coding stream Te generated by the video coding apparatus 11 and decoded by the video decoding apparatus 31 will be described.

Figure 2:
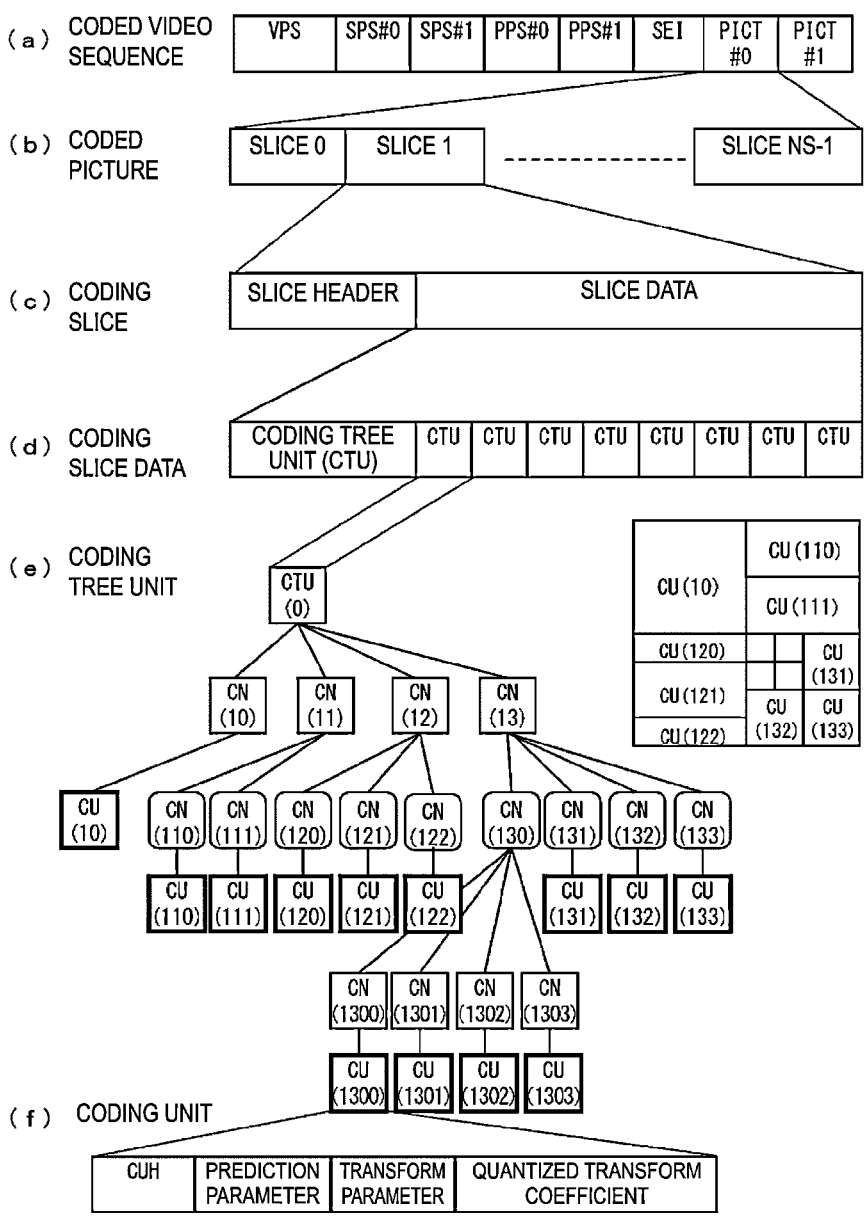
FIG. 2 is a diagram illustrating a hierarchical structure of data of a coding stream.

FIG. 2 is a diagram illustrating a hierarchical structure of data of the coding stream Te. The coding stream Te includes, as an example, a sequence and multiple pictures constituting the sequence. (a) to (f) of FIG. 2 are diagrams illustrating a coded video sequence predefining a sequence SEQ, a coded picture defining a picture PICT, a coding slice defining a slice S, a coding slice data defining slice data, a coding tree unit included in the coding slice data, and a coding unit included in the coding tree unit, respectively.

Coded Video Sequence

In the coded video sequence, a set of data referred to by the video decoding apparatus 31 to decode a sequence SEQ to be processed is defined. As illustrated in FIG. 2, the sequence SEQ includes a Video Parameter Set, Sequence Parameter Sets SPS, Picture Parameter Sets PPS, an Adaptation Parameter Set (APS), a picture PICT, and Supplemental Enhancement Information SEI.

The video parameter set VPS defines, in a video including multiple layers, a set of coding parameters common to multiple video images and a set of coding parameters relating to multiple layers and individual layers included in the video.

In the sequence parameter sets SPSs, a set of coding parameters referred to by the video decoding apparatus 31 to decode a target sequence is defined. For example, a width and a height of a picture are defined. Note that multiple SPSs may exist. In that case, any of the multiple SPSs is selected from the PPS.

In the picture parameter sets (PPS), a set of coding parameters that the video decoding apparatus 31 refers to in order to decode each picture in the target sequence s defined. For example, a PPS includes a reference value for a quantization step size used in picture decoding (pic_init_qp_minus26) and a flag indicating application of weighted prediction (weighted_pred_flag). Note that multiple PPSs may exist. In that case, any of the multiple PPSs is selected from each picture in a target sequence.

Coded Picture

In the coded picture, a set of data referred to by the video decoding apparatus 31 to decode a picture PICT to be processed is defined. The picture PICT includes slice 0 to slice NS-1 (NS is the total number of slices included in the picture PICT) as illustrated in FIG. 2.

Note that in a case that it is not necessary to distinguish each of the slice 0 to the slice NS-1 below, numeric suffixes of reference signs may be omitted. In addition, the same applies to other data with suffixes included in the coding stream Te which will be described below.

Coding Slice

In each coding slice, a set of data referred to by the video decoding apparatus 31 to decode a slice S to be processed is defined. The slice includes a slice header and slice data as illustrated in FIG. 2.

The slice header includes a coding parameter group referred to by the video decoding apparatus 31 to determine a decoding method for a target slice. Slice type indication information (slice_type) indicating a slice type is one example of a coding parameter included in the slice header.

Examples of slice types that can be indicated by the slice type indication information include (1) an I slice for which only intra prediction is used for coding, (2) a P slice for which unidirectional prediction or intra prediction is used for coding, (3) a B slice for which unidirectional prediction, bidirectional prediction, or intra prediction is used for coding. Note that the inter prediction is not limited to uni-prediction and bi-prediction, and the prediction image may be generated by using a larger number of reference pictures. Hereinafter, in a case of being referred to as the P or B slice, a slice that includes a block in which the inter prediction can be used is indicated.

Note that the slice header may include a reference to the picture parameter set PPS (pic_parameter_set_id).

Coding Slice Data

In coding slice data, a set of data referred to by the video decoding apparatus 31 to decode slice data to be processed is defined. The slice data includes CTUs as illustrated in FIG. 2(d). The CTU is a block of a fixed size (for example, 64×64) constituting a slice, and may also be called a Largest Coding Unit (LCU).

Coding Tree Unit

In FIG. 2, a set of data referred to by the video decoding apparatus 31 to decode a CTU to be processed is defined. The CTU is split into coding units CUs, each of which is a basic unit of coding processing, by a recursive Quad Tree split (QT split), Binary Tree split (BT split), or Ternary Tree split (TT split). The BT splitting and the TT splitting are collectively referred to as Multi Tree (MT) splitting. Nodes of a tree structure obtained by recursive quad tree splits are referred to as Coding Nodes. Intermediate nodes of a quad tree, a binary tree, and a ternary tree are coding nodes, and the CTU itself is also defined as the highest coding node. The lowest coding node is defined as the coding unit.

Different trees may be used between luminance (first color component, cIdx=0) and chrominance (second and third color components, cIdx=1, 2). The type of the tree is represented by treeType. For example, in a case that a common tree is used for luminance and chrominance, a common single tree is represented by treeType=SINGLE_TREE. In a case that two different trees (dual tree) are used between luminance (Y, cIdx=0) and chrominance (Cb/Cr, cIdx=1, 2), the tree of luminance is represented by treeType=DUAL_TREE_LUMA, and the tree of chrominance is represented by treeType=DUAL_TREE_CHROMA. In a case of DUAL_TREE_CHROMA, only a chroma image is coded and decoded, and is hence also simply referred to as a chroma tree.

Coding Unit

In FIG. 2, a set of data referred to by the video decoding apparatus 31 to decode a coding unit to be processed is defined. Specifically, the CU includes a CU header CUH, a prediction parameter, a transform parameter, a quantized transform coefficient, and the like. In the CU header, a prediction mode and the like are defined.

There are cases that the prediction processing is performed in units of CU or performed in units of sub-CU in which the CU is further split. In a case that the sizes of a CU and a sub-CU are equal to each other, the number of sub-CUs in the CU is one. In a case that a CU is larger in size than a sub-CU, the CU is split into sub-CUs. For example, in a case that a CU has a size of 8×8, and a sub-CU has a size of 4×4, the CU is split into four sub-CUs which include two horizontal splits and two vertical splits.

Types of prediction (prediction mode) include intra prediction (MODE_INTRA), inter prediction (MODE_INTER), and an intra-block copy (MODE_IBC). The intra prediction refers to prediction in an identical picture, and the inter prediction refers to prediction processing performed between different pictures (for example, between pictures of different display times, and between pictures of different layer images).

Transform and quantization processing is performed in units of CU, but the quantized transform coefficient may be subjected to entropy coding in units of subblock such as 4×4.

Prediction Parameters

A prediction image is derived by prediction parameters associated with blocks. The prediction parameters include intra prediction and inter prediction parameters.

Prediction Parameters for Inter Prediction

The prediction parameters for inter prediction will be described. The inter prediction parameters include prediction list utilization flags predFlagL0 and predFlagL1, reference picture indexes refIdxL0 and refIdxL1, and motion vectors mvL0 and mvL1. predFlagL0 and predFlagL1 are flags indicating whether reference picture lists (L0 list and L1 list) are used, and in a case that the value of each of the flags is 1, a corresponding reference picture list is used. Note that, in a case that the present specification mentions "a flag indicating whether or not XX", a flag being other than 0 (for example, 1) assumes a case of XX, and a flag being 0 assumes a case of not XX, and 1 is treated as true and 0 is treated as false in a logical negation, a logical product, and the like (hereinafter, the same is applied). However, other values can be used for true values and false values in real apparatuses and methods.

Syntax elements for deriving the inter prediction parameters include, for example, a merge flag merge_flag (general_merge_flag), a merge index merge_idx, merge_subblock_flag indicating whether to use inter prediction in units of subblock, regulare_merge_flag, ciip_flag indicating whether to use a combined inter-picture merge and intra-picture prediction (CIIP) mode or use a Geometric partitioning merge mode (GPM mode), merge_gpm_partition_idx indicating a split shape of the GPM mode, merge_gpm_idx0 and merge_gpm_idx1 indicating the merge indexes of the GPM mode, an inter prediction indicator inter_pred_idc for selecting a reference picture to be used in an AMVP mode, a reference picture index refIdxLX, a prediction vector index mvp_LX_idx for deriving a motion vector, a difference vector mvdLX, and a motion vector resolution mode amvr_mode.

Reference Picture List

A reference picture list is a list including reference pictures stored in a reference picture memory 306. For individual CUs, which picture in a reference picture list RefPicListX (X=0 or 1) is actually referred to is indicated with refIdxLX. Note that LX is a description method used in a case of not distinguishing an L0 prediction and an L1 prediction, and in the following description, distinguishes parameters for the L0 list and parameters for the L1 list by replacing LX with L0 and L1.

Merge Prediction and AMVP Prediction

A decoding (coding) method for prediction parameters include a merge prediction (merge) mode (merge mode) and an Advanced Motion Vector Prediction (AMVP) mode, and merge_flag is a flag for identifying the modes. The merge mode is a prediction mode in which some or all of motion vector differences are omitted, and a prediction list utilization flag predFlagLX, reference picture index refIdxLX, and a motion vector mvLX are derived from prediction parameters for neighboring blocks already processed, or the like, without being included in coded data. The AMVP mode is a mode in which inter_pred_idc, refIdxLX, and mvLX are included in the coded data. Note that mvLX is coded as mvp_LX_idx for identifying a prediction vector mvpLX and a difference vector mvdLX. In addition, the prediction mode in which the motion vector difference is omitted or simplified is collectively called a general merge mode, and the general merge mode and the AMVP prediction may be selected by general_merge_flag. Furthermore, in a case that regular_merge_flag is transmitted, and regular_merge_flag is 1, the normal merge mode or the MMVD may be selected, and otherwise the CIIP mode or the GPM mode may be selected. In the CIIP mode, a prediction image is generated using a weighted sum of an inter prediction image and an intra prediction image. In the GPM mode, a prediction image is generated as two non-rectangular prediction units obtained by splitting a target CU along a line segment.

inter_pred_idc is a value indicating the types and number of reference pictures, and takes any value of PRED_L0, PRED_L1, or PRED_BI. PRED_L0 and PRED_L1 indicate uni-prediction which use one reference picture managed in the L0 list and one reference picture managed in the L1 list, respectively. PRED_BI indicates bi-prediction which uses two reference pictures managed in the L0 list and the L1 list.

merge_idx is an index indicating which prediction parameter is used as a prediction parameter for a target block, among prediction parameter candidates (merge candidates) derived from process-completed blocks.

Motion Vector mvLX indicates a shift amount between blocks in two different pictures. A prediction vector and a difference vector related to mvLX are referred to as mvpLX and mvdLX, respectively.

Inter Prediction Indicator inter_pred_idc and Prediction List Utilization Flag predFlagLX Relationships between inter_pred_idc and predFlagL0 and predFlagL1 are as follows, and can be transformed into one another.

$$inter\_pred\_idc = (predFlagL1 \ll 1) + predFlagL0$$

$$predFlagL0 = inter\_pred\_idc \ \& \ 1$$

$$predFlagL1 = inter\_pred\_idc \gg 1$$

Note that the inter prediction parameters may use a prediction list utilization flag or may use an inter prediction indicator. In addition, determination using a prediction list utilization flag may be replaced with determination using an inter prediction indicator. On the contrary, determination using an inter prediction indicator may be replaced with determination using a prediction list utilization flag.

Determination of Bi-Prediction biPred

A flag biPred for identifying bi-prediction can be derived from whether two prediction list utilization flags are both 1. Alternatively, biPred can be also derived from whether the inter prediction indicator is a value indicating the use of two prediction lists (reference pictures).

Configuration of Video Decoding Apparatus

Figure 3:
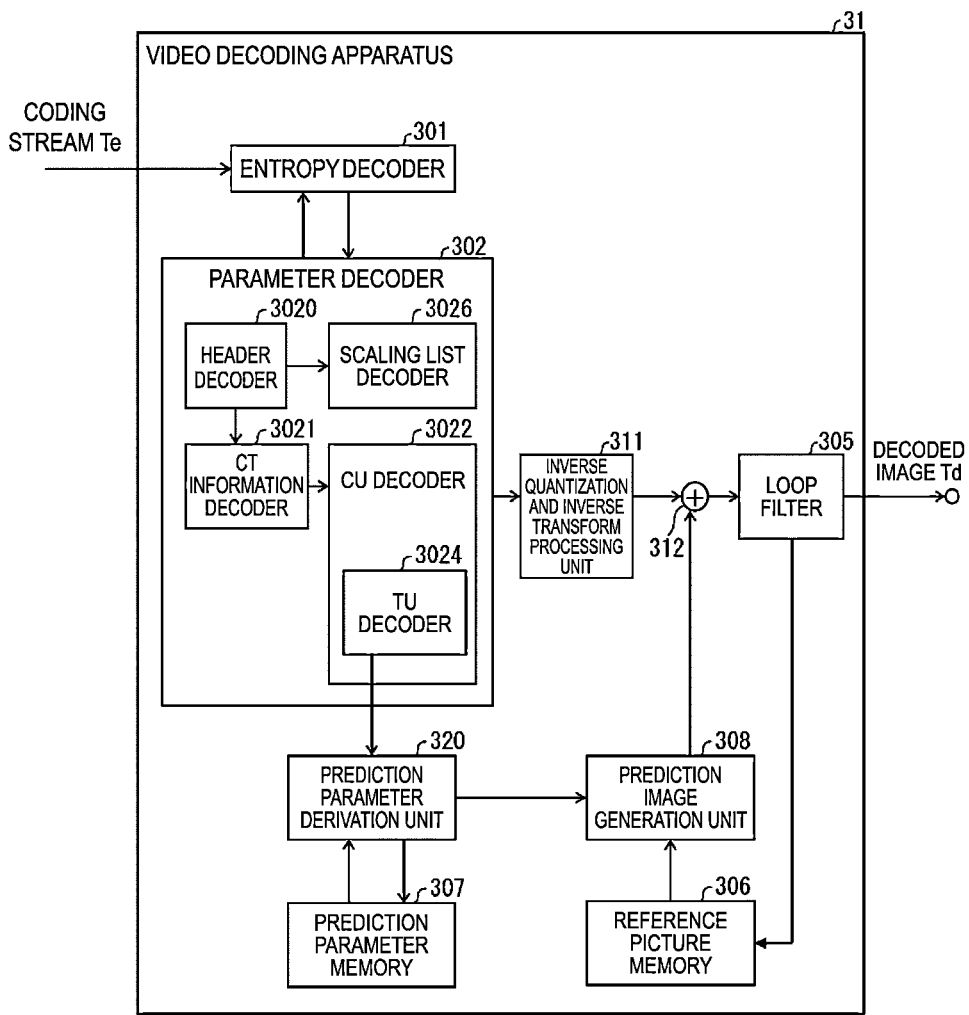
FIG. 3 is a schematic diagram illustrating a configuration of a video decoding apparatus.

A configuration of the video decoding apparatus 31 (FIG. 3) according to the present embodiment will be described.

The video decoding apparatus 31 includes an entropy decoder 301, a parameter decoder (a prediction image decoding apparatus) 302, a loop filter 305, a reference picture memory 306, a prediction parameter memory 307, a prediction image generation unit (prediction image generation apparatus) 308, an inverse quantization and inverse transform processing unit 311, an addition unit 312, and a prediction parameter derivation unit 320. Note that a configuration in which the loop filter 305 is not included in the video decoding apparatus 31 may be used in accordance with the video coding apparatus 11 described below.

The parameter decoder 302 further includes a header decoder 3020, a CT information decoder 3021, and a CU decoder 3022 (prediction mode decoder), and the CU decoder 3022 further includes a TU decoder 3024. These may be collectively referred to as a decoding module. The header decoder 3020 decodes, from coded data, parameter set information such as the VPS, the SPS, the PPS, and an APS, and a slice header (slice information). The CT information decoder 3021 decodes a CT from coded data. The CU decoder 3022 decodes a CU from coded data.

The CU decoder 3022 may decode a subblock transform flag cu_sbt_flag. In a case that cu_sbt_flag is 1, the CU is split into multiple subblocks, and subblock transform of performing transform in units of subblock is used. Further, the CU decoder 3022 may decode a flag cu_sbt_quad_flag indicating whether the size of the subblock to be transformed is ¼ or ½ of the CU, cu_sbt_horizontal_flag indicating a split direction, and cu_sbt_pos_flag indicating a subblock including a non-zero transform coefficient.

The CU decoder 3022 decodes, from the coded data, a parameter lfnst_idx indicating whether a non-separable transform is used and a non-separable transform matrix. Specifically, in a case that the width and the height of the CU are equal to or greater than 4 and the prediction mode is the intra prediction mode, the CU decoder 3022 decodes lfnst_idx. Note that lfnst_idx being 0 indicates no application of the non-separable transform, lfnst_idx being 1 indicates one transform matrix of a set (pair) of non-separable transform matrices, and lfnst_idx being 2 indicates the other transform matrix of the pair.

Alternatively, lfnst_idx may be 0 or 1. lfnst_idx may be derived from a mode number of the intra prediction.

The CU decoder 3022 decodes a value mts_idx indicating a transform matrix of Multiple Transform Selection (MTS) from the coded data. Specifically, in a case that the width and the height of the CU are equal to or greater than 32 and lfnst_idx is 0, the CU decoder 3022 decodes mts_idx. In MTS, one transform matrix is selected out of multiple transform matrix candidates and is used.

The CU decoder 3022 may decode intra_subpartitions_mode_flag. intra_subpartitions_mode_flag indicates whether it is intra subblock split (Intra Subpartitining Prediction, ISP), in which a luma block is split into subblocks and then processed. In a case that intra_subpartitions_mode_flag is 0, IntraSubPartitionsSplitType is set equal to ISP_NO_SPLIT (=0), and ISP is not used. In a case that intra_subpartitions_mode_flag is other than 0, intra_subpartitions_split_flag indicating a split direction is further decoded, and the following is set. IntraSubPartitionsSplitType is a parameter indicating a state of a subblock.

---

IntraSubPartitionsSplitType = intra_subpartitions_split_flag == 0 ?
ISP_HOR_SPLIT : ISP_VER_SPLIT

---

In a case that a size of the transform unit (tbWidth and tbHeight) is equal to or smaller than a prescribed maximum size (tbWidth<=Max TsSize && tbHeight<=Max TsSize), the TU decoder 3024 decodes transform_skip_flag[x0][y0][cIdx].

In a case that the TU includes a prediction error (for example, in a case that tu_cbf_luma[x0][y0] is 1), the TU decoder 3024 decodes, from the coded data, the QP update information and the quantized transform coefficient. Derivation of the quantized transform coefficient may involve multiple modes (for example, an RRC mode and a TSRC mode). Regular Residual Coding (RRC) is a decoding mode of a prediction error using transform, and Transform Skip Residual Coding (TSRC) is a decoding mode of a prediction error in a transform skip mode in which transform is not performed. In the RRC mode, the TU decoder 3024 may decode a LAST position of the transform coefficient, and in the TSRC mode, the TU decoder 3024 need not decode the LAST position. The QP update information is a difference value from a quantization parameter prediction value qPpred, which is a prediction value of a quantization parameter QP.

The prediction image generation unit 308 includes an inter prediction image generation unit 309 (FIG. 4) and an intra prediction image generation unit 310.

The prediction parameter derivation unit 320 includes an inter prediction parameter derivation unit 303 (FIG. 5) and an intra prediction parameter derivation unit.

In addition, although an example in which CTUs and CUs are used as processing units will be described below, the processing is not limited to this example, and processing in units of sub-CUs may be performed. Alternatively, the CTUs and the CUs may be replaced with blocks, the sub-CUs may be replaced with by subblocks, and processing may be performed in units of blocks or subblocks.

The entropy decoder 301 performs entropy decoding on the coding stream Te input from the outside and decodes individual codes (syntax elements). The entropy coding includes a scheme in which syntax elements are subjected to variable-length coding by using a context (probability model) that is adaptively selected according to a type of the syntax elements and a surrounding condition, and a scheme in which syntax elements are subjected to variable-length coding by using a table or a calculation expression determined in advance.

The entropy decoder 301 outputs the decoded codes to the parameter decoder 302. The decoded code is, for example, a prediction mode predMode, merge_flag, merge_idx, inter_pred_idc, refIdxLX, mvp_LX_idx, mvdLX, amvr_mode, and the like. Which code is to be decoded is controlled based on an indication of the parameter decoder 302.

Basic Flow

Figure 6:
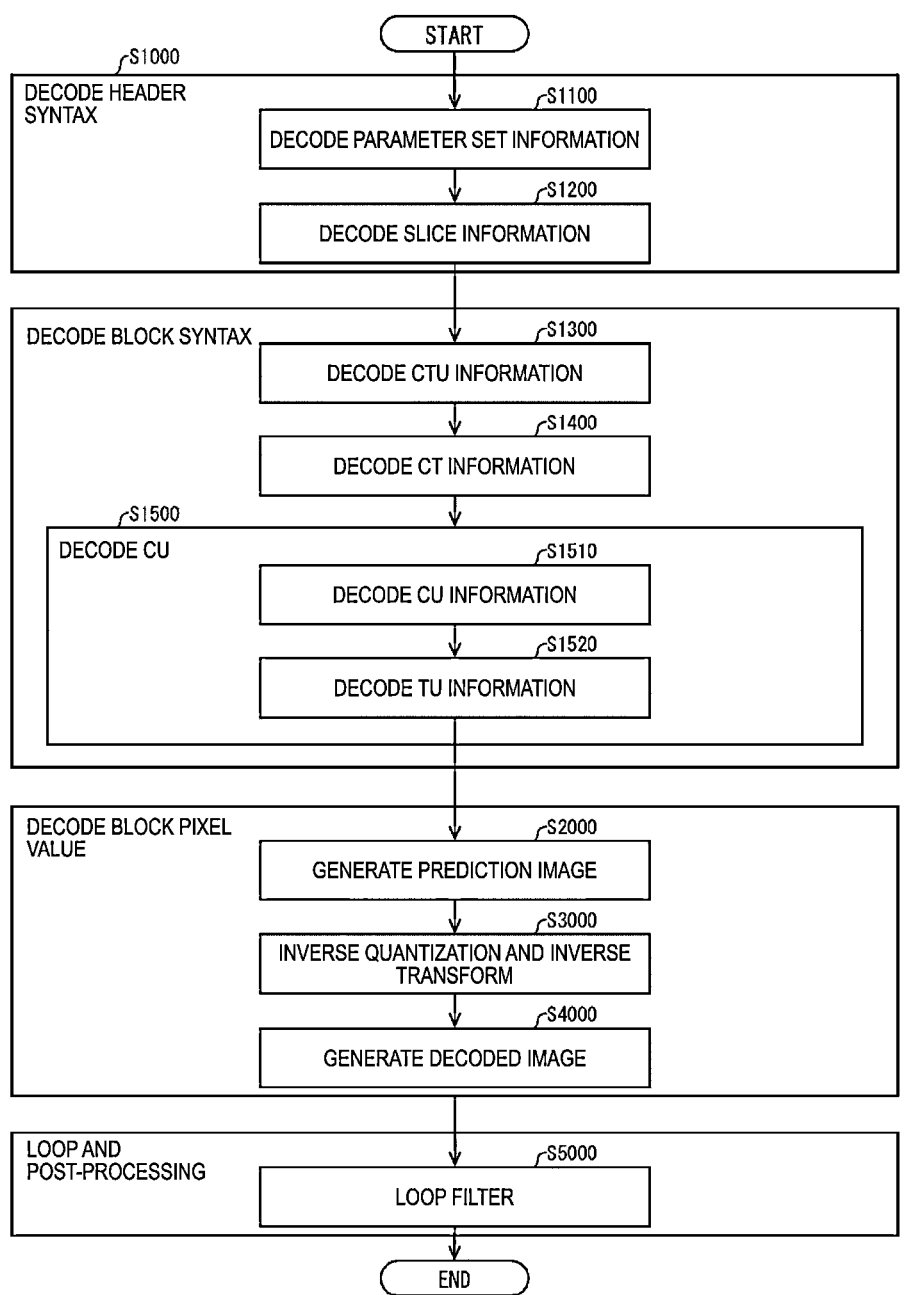
FIG. 6 is a flowchart illustrating general operation of the video decoding apparatus.

FIG. 6 is a flowchart illustrating general operation of the video decoding apparatus 31.

(S1100: Decoding of parameter set information) The header decoder 3020 decodes parameter set information such as the VPS, the SPS, and the PPS from coded data.

(S1200: Decoding of slice information) The header decoder 3020 decodes a slice header (slice information) from the coded data.

Afterwards, the video decoding apparatus 31 repeats the processing from S1300 to S5000 for each CTU included in the target picture, and thereby derives a decoded image of each CTU.

(S1300: Decoding of CTU information) The CT information decoder 3021 decodes the CTU from the coded data.

(S1400: Decoding of CT information) The CT information decoder 3021 decodes the CT from the coded data.

(S1500: Decoding of CU) The CU decoder 3022 decodes the CU from coded data by performing S1510 and S1520.

(S1510: Decoding of CU information) The CU decoder 3022 decodes CU information, prediction information, a TU split flag, a CU residual flag, and the like from the coded data.

(S1520: Decoding of TU information) In a case that a prediction error is included in the TU, the TU decoder 3024 decodes, from the coded data, a quantization prediction error, a transform index lfnst_idx, and the like.

Figure 8:
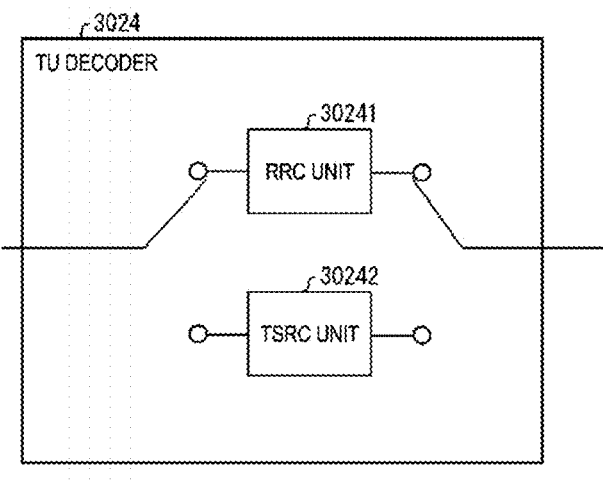
FIG. 8 is a schematic diagram illustrating a configuration of a TU decoder.

FIG. 8 is a block diagram of the TU decoder 3024, and includes an RRC unit 30241 and a TSRC unit 30242. The RRC unit 30241 decodes a normal prediction error using transform from the coded data, and the TSRC unit 30242 decodes a prediction error in the transform skip mode.

(S2000: Generation of prediction image) The prediction image generation unit 308 generates a prediction image, based on the prediction information, for each block included in the target CU.

(S3000: Inverse quantization and inverse transform) The inverse quantization and inverse transform processing unit 311 performs inverse quantization and inverse transform processing on each TU included in the target CU.

(S4000: Generation of decoded image) The addition unit 312 generates a decoded image of the target CU by adding the prediction image supplied by the prediction image generation unit 308 and the prediction error supplied by the inverse quantization and inverse transform processing unit 311.

(S5000: Loop filter) The loop filter 305 generates a decoded image by applying a loop filter such as a deblocking filter, an SAO, and an ALF to the decoded image.

The loop filter 305 is a filter provided in the coding loop, and is a filter that removes block distortion and ringing distortion and improves image quality. The loop filter 305 applies a filter such as a deblocking filter, a Sample Adaptive Offset (SAO), and an Adaptive Loop Filter (ALF) to a decoded image of a CU generated by the addition unit 312.

The reference picture memory 306 stores the decoded image of the CU generated by the addition unit 312 in a predetermined position for each target picture and target CU.

The prediction parameter memory 307 stores a prediction parameter in a position predetermined for each CTU or CU to be decoded. Specifically, the prediction parameter memory 307 stores the parameter decoded by the parameter decoder 302, the prediction mode predMode separated by the entropy decoder 301, and the like.

The prediction mode predMode, the prediction parameter, and the like are input to the prediction image generation unit 308. In addition, the prediction image generation unit 308 reads a reference picture from the reference picture memory 306. The prediction image generation unit 308 generates a prediction image of a block or a subblock by using the prediction parameter and the read reference picture (reference picture block) in the prediction mode indicated by the prediction mode predMode. Here, the reference picture block refers to a set of pixels (referred to as a block because they are normally rectangular) on a reference picture and is a region that is referred to for generating a prediction image.

Configuration of Inter Prediction Parameter Derivation Unit

Figure 5:
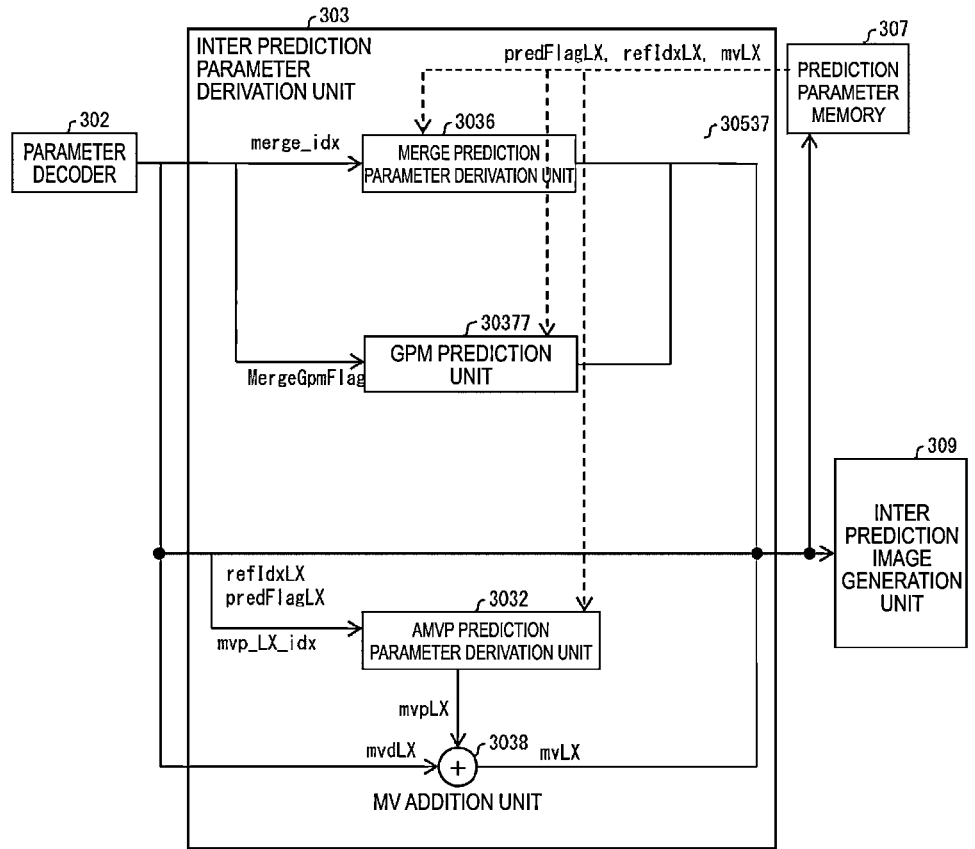
FIG. 5 is a schematic diagram illustrating a configuration of an inter prediction parameter derivation unit.

As illustrated in FIG. 5, the inter prediction parameter derivation unit 303 derives an inter prediction parameter with reference to the prediction parameters stored in the prediction parameter memory 307, based on the syntax element input from the parameter decoder 302. In addition, the inter prediction parameter is output to the inter prediction image generation unit 309 and the prediction parameter memory 307. Since the inter prediction parameter derivation unit 303 and an AMVP prediction parameter derivation unit 3032, a merge prediction parameter derivation unit 3036, a GPM prediction unit 30377, and a MV addition unit 3038 serving as internal elements of the inter prediction parameter derivation unit 303 are sections common to the video coding apparatus and the video decoding apparatus, they may be collectively referred to as a motion vector derivation unit (motion vector derivation apparatus).

In a case that merge_flag indicates 1, that is, the merge prediction mode, merge_idx is derived and output to the merge prediction parameter derivation unit 3036.

In a case that merge_flag indicates 0, that is, the AMVP prediction mode, the AMVP prediction parameter derivation unit 3032 derives mvpLX from inter_pred_idc, refIdxLX, or mvp_LX_idx.

MV Addition Unit

The MV addition unit 3038 adds derived mvpLX and mvdLX together to derive mvLX.

Merge Prediction

The merge prediction parameter derivation unit 3036 includes a merge candidate derivation unit 30361 and a merge candidate selection unit 30362. Note that a merge candidate includes the prediction parameters (predFlagLX, mvLX, and refIdxLX) and is stored in a merge candidate list. The merge candidate stored in the merge candidate list has an index assigned in accordance with a prescribed rule.

The merge candidate derivation unit 30361 derives the merge candidate using the motion vector and refIdxLX for the decoded adjacent block without any change. In addition, the merge candidate derivation unit 30361 may apply spatial merge candidate derivation processing, temporal merge candidate derivation processing, and the like described below.

As the spatial merge candidate derivation processing, the merge candidate derivation unit 30361 reads the prediction parameter stored in the prediction parameter memory 307 in accordance with a prescribed rule, and sets the prediction parameter as a merge candidate. For example, the prediction parameters at the positions of A1, B1, B0, A1, and B2 are read.

$$A1: (xCb - 1, yCb + cbHeight - 1)$$

$$B1: (xCb + cbWidth - 1, yCb - 1)$$

$$B0: (xCb + cbWidth, yCb - 1)$$

$$A0: (xCb - 1, yCb + cbHeight)$$

$$B2: (xCb - 1, yCb - 1)$$

The target block has upper left coordinates (xCb, yCb), a width cbWidth, and a height cbHeight.

As temporal merge derivation processing, the merge candidate derivation unit 30361 reads, from the prediction parameter memory 307, the prediction parameter for a block C in the reference image including the lower right coordinates CBR or the center coordinates of the target block, specifies the block C as a merge candidate Col, and stores the block C in the merge candidate list mergeCandList[ ].

The order of storage in mergeCandList[ ] is spatial merge candidates (B1, A1, B0, A0, and B2), and the temporal merge candidate Col. Note that a reference block that is not available (intra prediction block, or the like) is not stored in the merge candidate list.

```
i = 0
if(availableFlagB1)
    mergeCandList[i++] = B1
if(availableFlagA1)
    mergeCandList[i++] = A1
if(availableFlagB0)
    mergeCandList[i++] = B0
if(availableFlagA0)
    mergeCandList[i++] = A0
if(availableflagB2)
    mergeCandList[i++] = B2
if(availableFlagCol)
    mergeCandList[i++] = Col
```

Furthermore, the history merge candidate HmvpCand, the average candidate avgCand, and the zero merge candidate zeroCandm may be added to mergeCandList[ ] and used. The merge candidate selection unit 30362 selects a merge candidate N indicated by merge_idx from the merge candidates included in the merge candidate list, in accordance with the expression below.

$$N = mergeCandList[merge\_idx]$$

Here, N is a label indicating a merge candidate, and takes A1, B1, B0, A0, B2, Col, and the like. The motion information of the merge candidate indicated by the label N is indicated by (mvLXN[0], mvLXN[1]), predFlagLXN, and refIdxLXN.

The selected (mvLXN[0], mvLXN[0]), predFlagLXN, and refIdxLXN are selected as inter prediction parameters for the target block. The merge candidate selection unit 30362 stores the inter prediction parameter for the selected merge candidate in the prediction parameter memory 307 and outputs the inter prediction parameter to the inter prediction image generation unit 309.

Inter Prediction Image Generation Unit 309

In a case that predMode indicates the inter prediction, the inter prediction image generation unit 309 generates a prediction image of a block or a subblock through the inter prediction by using the inter prediction parameters input from the inter prediction parameter derivation unit 303 and the reference picture.

Figure 4:
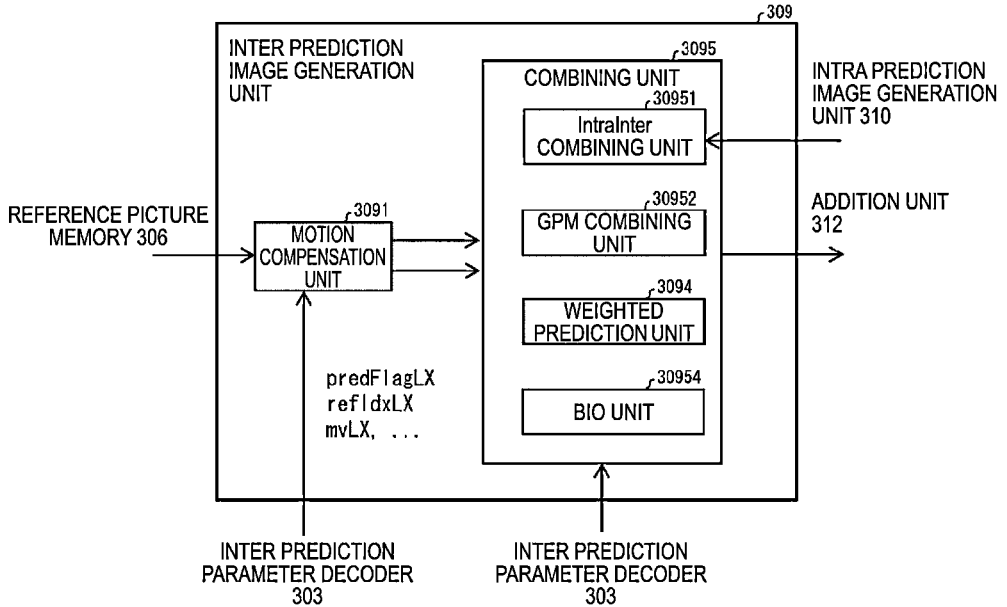
FIG. 4 is a schematic diagram illustrating a configuration of an inter prediction image generation unit.

FIG. 4 is a schematic diagram illustrating a configuration of the inter prediction image generation unit 309 included in the prediction image generation unit 308 according to the present embodiment. The inter prediction image generation unit 309 includes a motion compensation unit (prediction image generation apparatus) 3091 and a combining unit 3095. The combining unit 3095 includes an IntraInter combining unit 30951, a GPM combining unit 30952, a BIO unit 30954, and a weighted prediction unit 3094.

Motion Compensation

The motion compensation unit 3091 (interpolation image generation unit 3091) generates an interpolation image (motion compensation image) by reading a reference block from the reference picture memory 306 based on the inter prediction parameters (predFlagLX, refIdxLX, and mvLX) input from the inter prediction parameter derivation unit 303. The reference block is a block located on the reference picture RefPicLX indicated by refIdxLX, at a position shifted by mvLX from the position of the target block. Here, in a case that mvLX does not have an integer precision, an interpolation image is generated by using a filter referred to as a motion compensation filter for generating pixels at the fractional positions.

The motion compensation unit 3091 first derives an integer position (xInt, yInt) and a phase (xFrac, yFrac) corresponding to in-prediction block coordinates (x, y) by the following expression.

$$xInt = xPb + (mvLX[0] \gg (\log2(MVPREC))) + x$$

$$xFrac = mvLX[0] \,\&\, (MVPREC - 1)$$

$$yInt = yPb + (mvLX[1] \gg (\log2(MVPREC))) + y$$

$$yFrac = mvLX[1] \,\&\, (MVPREC - 1)$$

Here, (xPb, yPb) indicates the upper left coordinates of a block with a bW*bH size, that is, x=0, . . . , bW−1, y=0, . . . , bH−1, and MVPREC indicates the precision of mvLX (1/MVPREC pixel precision). For example, MVPREC=16.

The motion compensation unit 3091 derives a temporary image temp[ ][ ] by performing a horizontal interpolation on a reference picture refImg using an interpolation filter. In the expression below, Σ is the sum related to k of k=0, . . . , NTAP−1, shift1 is a normalization parameter for adjusting a value range, and offset1=1<<(shift1−1).

$$temp[x][y] =$$

$$\left( \sum mcFilter[xFrac][k] * refImg[xInt + k - NTAP/2 + 1][yInt] + offset1 \right) \gg shift1$$

Subsequently, the motion compensation unit 3091 derives an interpolation image Pred[ ][ ] by performing a vertical interpolation processing on the temporary image temp[ ][ ]. In the expression below, Σ is the sum related to k of k=0, . . . , NTAP−1, shift2 is a normalization parameter for adjusting a value range, and offset2=1<<(shift2−1).

$$Pred[x][y] =$$

$$\left( \sum mcFilter[yFrac][k] * temp[x][y + k - NTAP/2 + 1] + offset2 \right) \gg shift2$$

Note that, for bi-prediction, Pred[ ][ ] described above, or interpolation images PredL0[ ][ ] and PredL1[ ][ ], are derived for each of the L0 list and the L1 list, and the interpolation image Pred[ ][ ] is generated from PredL0[ ][ ] and PredL1[ ][ ].

GPM Combining Processing

In a case that ciip_mode is 0, the GPM combining unit 30952 generates a prediction image of the GPM mode, using a weighted sum of multiple inter prediction images.

IntraInter Combining Processing

In a case that ciip_mode is 1, the IntraInter combining unit 30951 generates a prediction image, a prediction image of the CIIP mode, using a weighted sum of an inter prediction image and an intra prediction image.

BIO Prediction

In a bi-prediction mode, the BIO unit 30954 generates a prediction image with reference to two prediction images (first prediction image and second prediction image) and a gradient correction term.

Weighted Prediction

The weighted prediction unit 3094 generates a prediction image of a block by multiplying an interpolation image PredLX by a weighting factor.

The inter prediction image generation unit 309 outputs the generated prediction image of the block to the addition unit 312.

Intra Prediction Image Generation Unit

In a case that predMode indicates the intra prediction, the intra prediction image generation unit performs intra prediction by using an intra prediction parameter input from the intra prediction parameter derivation unit and a reference pixel read from the reference picture memory 306.

The inverse quantization and inverse transform processing unit 311 performs inverse quantization on a quantized transform coefficient input from the parameter decoder 302 to derive a transform coefficient.

Inverse Quantization and Inverse Transform

Figure 7:
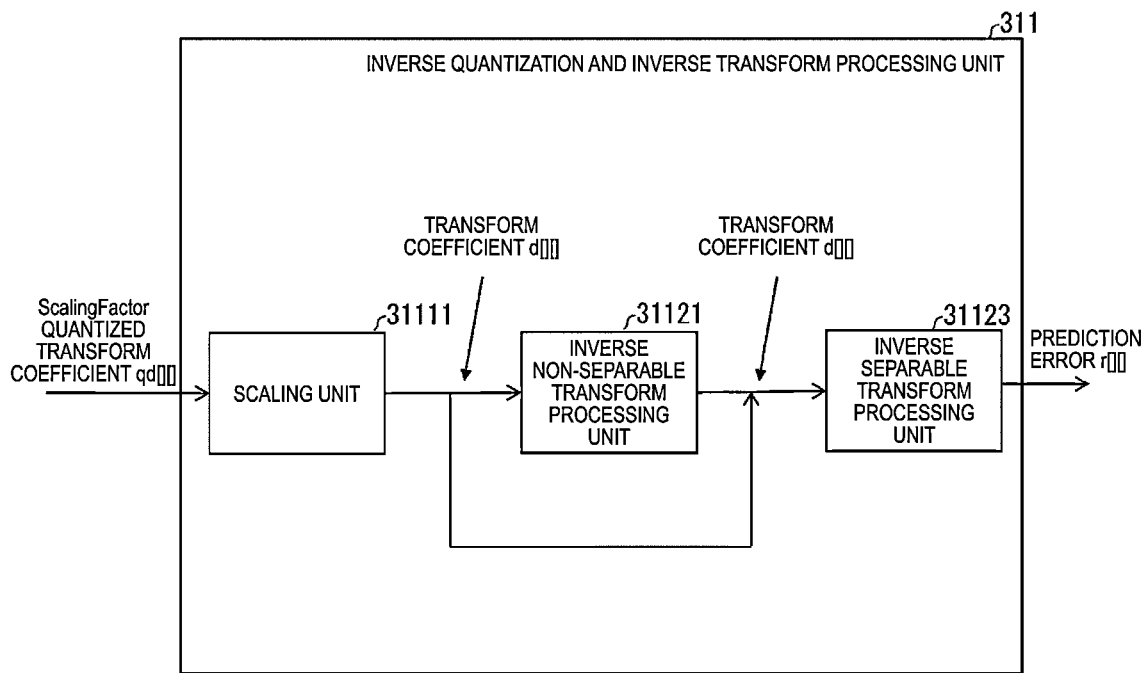
FIG. 7 is a functional block diagram illustrating a configuration example of an inverse quantization and inverse transform processing unit.

FIG. 7 is a block diagram illustrating a configuration of the inverse quantization and inverse transform processing unit 311 according to the present embodiment. The inverse quantization and inverse transform processing unit 311 includes a scaling unit 31111, an inverse non-separable transform processing unit 31121, and an inverse separable transform processing unit 31123.

The inverse quantization and inverse transform processing unit 311 scales (inverse-quantizes) the quantized transform coefficient qd[ ][ ] input from the entropy decoder 301 to derive a transform coefficient d[ ][ ] by using the scaling unit 31111. The quantized transform coefficient qd[ ][ ] is obtained by further performing non-separable transform and quantization on a coefficient obtained by performing transform such as Discrete Cosine Transform (DCT) and Discrete Sine Transform (DST) and quantization on a prediction error, or a transformed coefficient, in coding processing. In a case that lfnst_idx !=0, the inverse quantization and inverse transform processing unit 311 performs inverse transform using the inverse non- separable transform processing unit 31121. Further, inverse separable transform such as inverse DCT and inverse DST is performed on the transform coefficient, and the prediction error is calculated. In a case that lfnst_idx==0, inverse separable transform such as inverse DCT and inverse DST is performed on the transform coefficient scaled by the scaling unit 31111, without causing the inverse non-separable transform processing unit 31121 to perform, and the prediction error is calculated. The inverse quantization and inverse transform processing unit 311 outputs the prediction error to the addition unit 312.

Note that the inverse transform and the transform are paired processing, and thus the transform and the inverse transform may be interpreted as being replaced with each other. Alternatively, the transform may be referred to as forward transform in a case that the inverse transform is referred to as a transform. For example, the non-separable transform may be referred to as a forward non-separable transform in a case that the inverse non-separable transform is referred to as a non-separable transform. The separable transform is simply referred to as transform.

Details of Scaling Unit 31111

The scaling unit 31111 performs scaling by using a weight for each coefficient on the transform coefficient decoded by the TU decoder, using a quantization parameter and a scaling factor derived in the parameter decoder 302.

A scaled transform coefficient d[x][y] is transmitted to the inverse separable transform processing unit 31123 or the inverse non-separable transform processing unit 31121. The inverse non-separable transform processing unit 31121 applies the inverse non-separable transform to the transform coefficient d[ ][ ] after the inverse quantization and before the separable transform.

Non-Separable Transform and Inverse Non-Separable Transform

The non-separable transform (second transform) is applied to transform coefficients in a part or the entire region of a TU after the separable transform (DCT2, DST7, and the like) in the video coding apparatus 11. In the non-separable transform, correlation remaining in the transform coefficients is removed, and energy is concentrated on a part of the transform coefficients. The inverse non-separable transform is applied to transform coefficients of a part or the entire region of a TU in the video decoding apparatus 31. After the inverse non-separable transform is applied, an inverse separable transform (such as DCT2 and DST7) is applied to the transform coefficients after the inverse non-separable transform. In a case that a TU is split into 4×4 subblocks, the non-separable transform and the inverse non-separable transform are applied only to a prescribed top left subblock. Examples of sizes of a TU in which one of the width W and the height H of the TU is 4 include 4×4, 8×4, 4×8, L×4, and 4×L (L is a natural number of 16 or greater).

A technique for transmitting only some low-frequency components in transform coefficients after the separable transform is referred to as Reduced Secondary Transform (RST) or Low Frequency Non-Separable-Transform (LFNST). Specifically, in a case that the number nonZeroSize of transform coefficients of the separable transform to be transmitted is less than or equal to the size of the TU subjected to the separable transform ((1<<log 2StSize)× (1<<log 2StSize)), it is LFNST.

In the non-separable transform and the inverse non-separable transform, the following processing is performed depending on the size of the TU and the intra prediction mode (IntraPredMode). The inverse non-separable transform processing will be described below in order.

S1: Setting of Transform Size and Input/Output Size

In the inverse non-separable transform, depending on the size of the TU (width W, height H), the size (4×4 or 8×8) of the inverse non-separable transform, the number (nStOutSize) of output transform coefficients, the number nonZeroSize of transform coefficients (input transform coefficients) to which the inverse non-separable transform is applied, and the number (numStX, numStY) of subblocks to which the inverse non-separable transform is applied are derived. The sizes of the inverse non-separable transforms of 4×4 and 8×8 are indicated by nStSize=4 and 8. In addition, the sizes of the inverse non-separable transforms of 4×4 and 8×8 may also be referred to as RST 4×4 and RST 8×8, respectively.

In the inverse non-separable transform, in a case that the TU is equal to or larger than 8×8, 48 transform coefficients are output through the inverse non-separable transform of RST 8×8. In other words, nStSize=8 and nStOutSize=48. Otherwise, 16 transform coefficients are output through the inverse non-separable transform of RST 4×4. In other words, nStSize=4 and nStOutSize=16. In the inverse non-separable transform, in a case that the TU is 4×4 or 8×8, input transform coefficients are 8, that is, nonZeroSize=8. Otherwise, input transform coefficients are 16, that is, nonZeroSize=16.

In a case that W and H are both 8 or greater, log 2StSize=3 and nStOutSize=48

Otherwise, log 2StSize=2 and nStOutSize=16 nStSize=1<<log 2StSize

In a case that both W and H are 4 or 8, nonZeroSize=8. Otherwise, nonZeroSize=16

Note that nonZeroSize is not limited to 8 and 16. For example, it may be 12 or the like. nStOutSize is not limited to 16 and 48 either, and may be 32, 36, 64 or the like.

$$numStX = (nTbH == 4 \ \&\& \ nTbW > 8) \ ? \ 2{:}1$$

$$numStY = (nTbW == 4 \ \&\& \ nTbH > 8) \ ? \ 2{:}1$$

Note that numStX=numStY=1 may be invariably set without performing the non-separable transform on multiple subblocks.

S2: Rearrangement in One-Dimensional Signal

The inverse non-separable transform processing unit 31121 once rearranges a transform coefficient d[ ][ ] of a part of the TU in a one-dimensional array u[ ] for processing.

Specifically, the inverse non-separable transform processing unit 31121 derives u[ ] from the two-dimensional transform coefficient d[ ][ ] of the target TU indicated by a region RU with reference to the transform coefficient of x=0 . . . nonZeroSize−1. xC and yC are positions on the TU, and are derived from an array DiagScanOrder indicating a scan order and a position x of the transform coefficient in the subblock.

$$xC =$$

$$(xSbIdx << log2StSize) + DiagScanOrder[log2StSize][log2StSize][x][0]$$

$$yC = (ySbIdx << log2StSize) +$$

$$DiagScanOrder[log2StSize][log2StSize][x][1]$$

$$u[x] = d[xC][yC]$$

Note that a range copied in the one-dimensional array is referred to as a region RU.

S3: Application of Transform Processing

The inverse non-separable transform processing unit 31121 transforms u[ ] having a length of nonZeroSize using a transform matrix secTransMatrix[ ][ ], and derives a coefficient v[ ] of a one-dimensional array having a length of nStOutSize as an output.

Specifically, the inverse non-separable transform processing unit 31121 derives the transform matrix secTranMatrix [ ][ ] from a set number (lfnstTrSetId) of the non-separable transform, lfnst_idx indicating the transform matrix of the non-separable transform, and the non-separable transform size nStSize (nTrS). lfnstTrSetId is a set number of the non-separable transform derived from the intra prediction mode IntraPredMode. Furthermore, the inverse non-separable transform processing unit 31121 performs a product-sum operation of the transform matrix and the one-dimensional variable u[ ] as indicated in the following expression.

$$v[i] =$$

$$Clip3\left(CoeffMin, CoeffMax, \sum (secTransMatrix[i][j] * u[j] + 64) >> 7\right)$$

Here, Σ is the sum up to j=0 . . . nonZeroSize−1. In addition, i performs processing on 0 . . . nStSize−1. Coeff Min and Coeff Max indicate the ranges of the transform coefficient values.

S4: Two-Dimensional Mapping of One-Dimensional Signal After Transform Processing The inverse non-separable transform processing unit 31121 maps the coefficient v[ ] of the transformed one-dimensional array at a prescribed position in the TU again. The mapping method may be changed depending on PredModeIntra.

Specifically, in a case that PredModeIntra<=34, the following processing may be applied.

$$d[x][y] = (y < 4) ? v[x + (y << log2StSize)]: ((x < 4) ? v[32 +$$

$$x + ((y - 4) << 2)]: d[x][y])$$

Otherwise, the following expression is applied.

$$d[x][y] = (x < 4) ? v[y + (x << log2StSize)]: ((y < 4) ? v[32 +$$

$$y + ((x - 4) << 2)]: d[x][y])$$

The above-described determination of branching may be "PredModeIntra<=34 or PredModeIntra==INTRA_LT_CCLM, INTRA_T_CCLM, or INTRA_L_CCLM" or the like.

Inverse Separable Transform Processing Unit 31123

The inverse separable transform processing unit 31123 explicitly or implicitly switches the transform matrix. The transform used in the separable transform is separable transform including vertical transform and horizontal transform. Transform of separating a two-dimensional signal into a horizontal direction and a vertical direction may be defined as the separable transform. The transform matrices of the separable transform are DCT2, DST7, DCT8, DCT5, DST4, DST1, and IDT. IDT is identity transform. In the separable transform, the transform matrix is independently switched for each of the vertical transform and the horizontal transform. Note that selectable transform is not limited to the above, and other transform (transform matrix) may be used. The inverse separable transform processing unit 31123 is usually referred to as a transform processing unit. The inverse non-separable transform processing will be described below in order.

Decoding of Separable Transform Parameter

Each of FIG. 9, FIG. 10, and FIG. 11 is a syntax table related to the separable transform parameter.

As illustrated in FIG. 9, the parameter decoder 302 decodes sps_mts_enabled_flag in the SPS. In a case that sps_mts_enabled_flag is 1, it is indicated that sps_explic-it_mts_intra_enabled_flag and sps_explicit_mts_inter_en-abled_flag are present in the SPS. In a case that sps_mt-s_enabled_flag is 0, it is indicated that sps_explicit_mts_intra_enabled_flag and sps_explicit_mts_inter_en-abled_flag are not present in the SPS. In a case that sps_mt-s_enabled_flag indicates 1, the parameter decoder 302 fur-ther decodes sps_explicit_mts_intra_enabled_flag and sps_explicit_mts_inter_enabled_flag. sps_explicit_mts_in-tra_enabled_flag is a flag indicating whether mts_idx may be explicitly decoded in the block coded in the intra prediction. In a case that sps_explicit_mts_intra_enabled_flag is 1, it is indicated that mts_idx may be decoded in the block coded in the intra prediction. In a case that sps_explicit_mts_intra_enabled_flag is 0, it is indicated that mts_idx may not be decoded in the block coded in the intra prediction. In a case of not being decoded, sps_explicit_mts_intra_enabled_flag is inferred as 0. sps_explicit_mts_inter_enabled_flag is a flag indicating whether mts_idx may be explicitly decoded in the block coded in the inter prediction. In a case that sps_explicit_mts_inter_enabled_flag is 1, it is indicated that mts_idx may be decoded in the block coded in the inter prediction. In a case that sps_explicit_mts_inter_enabled_flag is 0, it is indicated that mts_idx may not be decoded in the block coded in the inter prediction. In a case of not being decoded, sps_explicit_mts_inter_enabled_flag is inferred as 0. Note that mts_idx is an index indicating the transform matrix of the separable transform.

FIG. 10 is syntax related to mts_idx. In decoding of mts_idx, first, the CU decoder 3022 sets variables MtsD-cOnly and MtsZeroOutSigCoeffFlag equal to 1, and calls the TU decoder 3024. MtsDcOnly is a flag indicating whether the non-zero transform coefficient in the TU is only a DC component. MtsZeroOutSigCoeffFlag is a flag indicating whether the non-zero coefficient is not present (is zeroed out) in a prescribed high frequency component of the TU. In a case that transform is used (in a case that transform_skip_flag is 0 or sh_ts_residual_coding_disabled_flag is 1, the transform skip mode is not used), the TU decoder 3024 (RRC unit 30241) decodes syntax of residual_coding( ) illustrated in FIG. 11. transform_skip_flag is a flag indicating whether transform skip is performed. sh_ts_residual_coding_disabled_flag is a flag indicating whether regular residual coding (RRC) is prohibited. First, a syntax element indicating the LAST position is decoded, and the LAST position (LastSignificantCoeffX, LastSignificantCoeffY) is derived. The LAST position is the last position of the non-zero coefficient in a case that the transform coefficient of the TU is scanned in a direction from a low frequency component to a high frequency component. Next, the RRC unit 30241 searches for the transform coefficient from the high frequency component toward the low frequency component, and derives the position (lastSubBlock) of the sub-block to which the LAST position belongs and the LAST position (lastScanPos) in the subblock. Then, in a case that cIdx==0 (luma block) and lastSubBlock>0 or lastScan-Pos>0 as illustrated in SYN_MtsLastPos of FIG. 11, the RRC unit 30241 sets the variable MtsDcOnly equal to 0. In a case that the RRC unit 30241 searches whether the non-zero coefficient is present in the block for each sub-block, the RRC unit 30241 sets the variable MtsZeroOut-SigCoeffFlag as illustrated in SYN_MtsZeroOutSigCoeff of FIG. 11. In other words, in a case that the non-zero coefficient is present in the subblock, the subblock position is at a position larger than a prescribed position, and cIdx==0, the variable MtsZeroOutSigCoeffFlag is set equal to 0. Thus, in a case that the non-zero transform coefficient is present in a prescribed subblock located in a high frequency component, MtsZeroOutSigCoeffFlag is turned off (=0). In a case that non-zero is not present in the prescribed subblock, MtsZe-roOutSigCoeffFlag remains 1. Only in a case that the TU is zeroed out, mts_idx is decoded. Here, for example, the prescribed position is a position at which a position (xS) of the subblock in the x direction is larger than 3, or a position (yS) thereof in the y direction is larger than 3 (xS>3∥yS>3).

The CU decoder 3022 decodes lfnst_idx indicating a transform set used for the non-separable transform LFNST or no performing of the non-separable transform. In a case that lfnst_idx is not decoded, a value of lfnst_idx is inferred as 0. Then, in a case that all of the following MTS Conditions 1 are satisfied and one of MTS Conditions 2 is satisfied as illustrated in SYN_CondMts of FIG. 10, the CU decoder 3022 decodes mts_idx.

MTS Conditions 1

(1-1) In the dual tree, it is not the chroma tree (tree-Type !=DUAL_TREE_CHROMA)

(1-2) The non-separable transform LFNST is not used (lfnst_idx==0)

(1-3) It is not the transform skip mode (transform_skip_flag[x0][y0][0]==0)

(1-4) The CU size is equal to or smaller than 32×32 (Max(cbWidth, cbHeight)<=32)

(1-5) The intra subblock split is not performed in an intra prediction block (IntraSubPartitionsSplit Type== ISP_NO_SPLIT)

(1-6) The subblock transform is not performed in an inter prediction block (cu_sbt_flag==0)

(1-7) The non-zero coefficient is not present at a high frequency position (MtsZeroOutSigCoeffFlag==1)

(1-8) The LAST position is not a position of the lowest frequency component (DC component) (MtsD-cOnly==0)

MTS Conditions 2

(2-1) sps_explicit_mts_inter_enabled_flag is 1 and the prediction mode is the inter prediction (2-2) sps_explicit_mts_intra_enabled_flag is 1 and the prediction mode is the intra prediction Note that, in a case that mts_idx is not decoded, 0 is inferred. As a value, mts_idx may have a value of 0 to 4. The CU decoder 3022 may code and decode mts_idx, using Truncated Rice (TR) binary or truncated binary (TB) with c Max=4 and cRiceParam=0.

Decoding of mts_idx

The CU decoder 3022 may change a value range of mts_idx related to the transform of the transform coefficient of the target TU (that is, the number of candidates of the transform matrix of the target TU), depending on the LAST position (the value of lastScanPos) of the target transform block (target TU). The CU decoder 3022 changes the value range of mts_idx, using multiple thresholds. Specifically, the CU decoder 3022 may change a maximum value c Max of mts_idx depending on the LAST position, and decode mts_idx. For example, in a case that lastScanPos is from TH1 to TH2, decoding may be performed using c Max=1 with the value range of mts_idx being 0 to 1. For example, TH1 may be 1, and TH2 may be 6. In this case, in addition to DCT2 (mts_idx==0), one transform matrix (for example, DST7), other than DCT2, is selectable. In a case that lastScanPos is larger than TH2 and TH3 or less, mts_idx may be decoded, using c Max=4 indicating 0 to 4. For example, TH3 may be 32. In this case, in addition to DCT2, four transform matrices (for example, DST7, DCT8, DCT5, and DST4) are selectable depending on mts_idx=1, 2, 3, 4. Finally, in a case that lastScanPos is larger than TH3, mts_idx may be decoded, using c Max=6 indicating 0 to 6. In this case, in addition to DCT2, six transform matrices (for example, DST7, DCT8, DCT5, DST4, DST1, and IDT), other than DCT2, are selectable. Note that the values of the thresholds TH1, TH2, and TH3 for changing the value range of mts_idx are not limited to the above values, and a selectable transform matrix(ces) is not limited to the above either. The parameter decoder 302 (CU decoder 3022) may decode the thresholds for changing the value range of mts_idx.

In the present example, the CU decoder 3022 changes the maximum value c Max used for coding and decoding of the syntax element of mts_idx, depending on the LAST position of the target block. More specifically, in a case that the LAST position is large (located in a high frequency), the value of c Max is increased, and mts_idx may be coded and decoded using c Max. The CU decoder 3022 may code and decode mts_idx, using each value of c Max and using truncated binary (TB). c Max is an upper limit value of a possible value of the syntax element. TB is binarization using known c Max. Alternatively, the CU decoder 3022 decodes whether other than DCT2 is used as the transform matrix with 1 bit. Subsequently, coding and decoding may be performed using TR or TB with reference to each c Max−1.

OTHER EXAMPLES OF DECODING OF SEPARABLE TRANSFORM PARAMETER

Other Example 1 of MTS Conditions

Regarding (1-8) of MTS Conditions 1 above, the CU decoder 3022 may use the number of non-zero coefficients instead of using the LAST position. In other words, the CU decoder 3022 may code and decode mts_idx, using the following condition as (1-8) of MTS Conditions 1.

(1-8) The number of non-zero coefficients is equal to or larger than a prescribed number (NonZero-CoeffNum>=NonZeroCoeffNumTh)

Here, NonZeroCoeffNum is the number of non-zero coefficients included in the TU block, and NonZeroCoeffNumTh is a threshold for NonZeroCoeffNum. For example, NonZeroCoeffNumTh=2 may hold. The following will describe a configuration in which the threshold for the number of non-zero coefficients is changed depending on the block size and the prediction mode.

Configuration in Which Threshold for Number of Non-Zero Coefficients is Changed Depending on Prediction Mode The CU decoder 3022 may derive the threshold for the number of non-zero coefficients depending on whether the prediction mode is the intra prediction or the inter prediction.

For example, in a case that the prediction mode of the target block is the intra prediction, the CU decoder 3022 may consider NonZeroCoeffNum being equal to or larger than IntraNonZeroCoeffNumTh as one of (1-8) of MTS Conditions 1. For example, IntraNonZeroCoeffNumTh may be 1 or 2.

On the other hand, in a case that the prediction mode of the target block is the inter prediction, similarly, the CU decoder 3022 may consider NonZeroCoeffNum being equal to or larger than InterNonZeroCoeffNumTh as one of (1-8) of MTS Conditions 1. For example, InterNonZeroCoeffNumTh may be 3 or 6.

Based on these, the CU decoder 3022 may code and decode mts_idx, using the following as (1-8) of MTS Conditions 1.

(1-8) The number of non-zero coefficients is equal to or larger than a prescribed number ((CuPredMode[chType][x0][y0]==MODE_INTRA && NonZero-CoeffNum>=IntraNonZeroCoeffNumTh)||(CuPred-Mode[chType][x0][y0]==MODE_INTER && NonZeroCoeffNum>=InterNonZeroCoeffNumTh))

Note that the values of IntraNonZeroCoeffNumTh and InterNonZeroCoeffNumTh are not limited to the above values.

As described above, in the present example, the video decoding apparatus determines whether to decode mts_idx, using the threshold for the number of non-zero coefficients, and the threshold is different depending on the prediction mode.

Configuration in Which Threshold for Number of Non-Zero Coefficients is Changed Depending on Block Size The CU decoder 3022 may derive the threshold for the number of non-zero coefficients depending on the block size of the target block.

For example, in a case that the TU size of the target block is smaller than a prescribed size, the CU decoder 3022 may consider NonZeroCoeffNum being equal to or larger than SNonZeroCoeffNumTh as one of (1-8) of MTS Conditions 1. For example, SNonZeroCoeffNumTh may be 1 or 2. The block size being smaller than the prescribed size indicates that the width and the height of the block size are smaller than the prescribed size (log 2TbWidth<BlkSizeW && log 2TbHeight<BlkSizeH). Alternatively, it indicates that the width or the height of the block size is smaller than the prescribed size (log 2TbWidth<BlkSizeW||log 2Tb-Height<BlkSizeH).

On the other hand, in a case that the block size of the target block is equal to or larger than the prescribed size, similarly, the CU decoder 3022 may consider NonZeroCoeffNum being equal to or larger than LNonZeroCoeffNumTh as one of (1-8) of MTS Conditions 1. For example, LNonZeroCoeffNumTh may be 3 or 6.

Based on these, the CU decoder 3022 may code and decode mts_idx, using the following condition as (1-8) of MTS Conditions 1.

(1-8) The number of non-zero coefficients is equal to or larger than a prescribed number ((log 2Tb-Width<BlkSizeW && log 2TbHeight<BlkSizeH && NonZeroCoeffNum>=SNonZeroCoeffNumTh)||((log 2TbWidth>=BlkSizeW||log 2TbHeight>=BlkSizeH) && NonZeroCoeffNum>=LNonZeroCoeffNumTh))

Note that the values of SNonZeroCoeffNumTh and LNonZeroCoeffNumTh are not limited to the above values.

As described above, in the present example, the video decoding apparatus determines whether to decode mts_idx, using the threshold for the number of non-zero coefficients, and the threshold is different depending on the block size.

Other Example 2 of MTS Conditions

Regarding (1-4) of MTS Conditions 1 above, for a high-resolution video, whether mts_idx is decoded with limitation of the CU size being extended to the CTU size may be determined. In other words, the CU decoder 3022 may code and decode mts_idx, using the following condition as (1-4) of MTS Conditions 1.

(1-4) The CU size is equal to or smaller than the CTU size (Max(cbWidth, cbHeight)<=CTUSize) (CTUSize is 128 or 256, for example)

The CU decoder 3022 may decode mts_idx in a case that all of the following MTS Conditions 1-2 are satisfied, with the conditions of (1-7) of MTS Conditions above being deleted.

MTS Conditions 1-2

(1-1) In the dual tree, it is not the chroma tree (tree-Type !=DUAL_TREE_CHROMA)

(1-2) The non-separable transform LFNST is not used (lfnst_idx==0)

(1-3) It is not the transform skip mode (transform_skip_flag[x0][y0][0]==0) (1-4) The CU size is equal to or smaller than the CTU size (Max(cbWidth, cbHeight) <=CTUSize) (CTUSize is 128 or 256, for example)

(1-5) The intra subblock split is not performed in an intra prediction block (IntraSubPartitionsSplit-Type==ISP_NO_SPLIT)

(1-6) The subblock transform is not performed in an inter prediction block (cu_sbt_flag==0)

(1-7) The LAST position is not a position of the lowest frequency component (DC component) (MtsD-cOnly==0)

This produces an effect of enhancing coding efficiency.

At the same time, there is a problem that time required for encoder search increases. In a case that a prediction residual is liable to occur, such as the intra prediction, coding can be efficiently performed using various transforms. On the other hand, in a case that a prediction residual does not easily occur, such as the inter prediction, coding may be sufficiently efficiently performed using only DCT2. The following example will describe an embodiment in which MTS is changed depending on the block size and the prediction mode.

Example in Which MTS Conditions Are Different between Intra Prediction and Inter Prediction In the present embodiment, a condition as to whether MTS is used is changed depending on the prediction mode. The CU decoder 3022 may change a maximum block size in a case that MTS is applied depending on whether the prediction mode (CuPredMode) of the current block is the intra prediction (MODE_INTRA) or the inter prediction (MODE_INTER). Specifically, as described below, in coding and decoding of mts_idx, as the block size, MAX_MTS_SIZE_INTRA may be used in the intra prediction, and MAX_MTS_SIZE_INTER may be used in the inter prediction. In other words, the CU decoder 3022 may code and decode mts_idx, using the following as (1-4) of MTS Conditions 1 (FIG. 13(*a*)).

(1-4) The prediction mode is the intra prediction and the CU size is equal to or smaller than MAX_MTS_SIZE_INTRA, or the prediction mode is the inter prediction and the CU size is equal to or smaller than MAX_MTS_SIZE_INTER (CuPredMode[chType][x0][y0]==MODE_INTRA && Max(cbWidth, cbHeight)<=MAX_MTS_SIZE_INTRA)|| (CuPredMode[chType][x0][y0]==MODE_INTER && Max (cbWidth, cbHeight)<=MAX_MTS_SIZE_INTER)

Alternatively, the CU decoder 3022 may code and decode mts_idx, with (1-4) of MTS Conditions 1 being deleted and the block size being added to MTS Conditions 2 instead (FIG. 13(*b*)).

MTS Conditions 2

(2-1) sps_explicit_mts_inter_enabled_flag is 1, the prediction mode is the inter prediction, and the CU size is equal to or smaller than MAX_MTS_SIZE_INTER (2-2) sps_explicit_mts_intra_enabled_flag is 1, the prediction mode is the intra prediction, and the CU size is equal to or smaller than MAX_MTS_SIZE_INTRA Here, as MAX_MTS_SIZE_INTRA>MAX_MTS_SIZE_INTRA, in the intra prediction, MTS may be applied in a large block, and in the inter prediction, MTS may be applied only to a smaller block. For example, MAX_MTS_SIZE_INTRA may be 128, and MAX_MTS_SIZE_INTER may be 32.

Further, zero out determination may be changed depending on the block size to be applied. In other words, in the intra prediction, MTS of up to 128 points is performed, and in the inter prediction, in a case that MTS of up to 32 points is performed, zero out determination in units of each 4×4 subblock can be performed as follows.

```
if( sb_coded_flag[ xS ][ yS ] && (( xS > 15 || yS > 15 ) &&
CuPredMod e[chType][x0][y0]==MODE_INTRA || ( xS > 3 ||
yS > 3 ) && CuPredMode[c hType][x0][y0]==MODE_INTER) && cIdx
== 0 )
    MtsZeroOutSigCoeffFlag = 0
``` xS is a position of the subblock in the x direction, and yS is a position of the subblock in the y direction. sb_coded_flag is a flag indicating whether the subblock includes the non-zero transform coefficient. Note that the following may be performed.

```
if( sb_coded_flag[ xS ][ yS ] && (( xS > MaxMtsIntraSz || yS >
MaxMts IntraSz ) && CuPredMode[chType][x0][y0]==MODE_INTRA ||
( xS > MaxMtsI nterSz || yS > MaxMtsInterSz ) &&
CuPredMode[chType][x0][y0]==MODE_IN TER) && cIdx == 0 )
    MtsZeroOutSigCoeffFlag = 0
```

Here, Max MtsIntraSz=(MAX_MTS_SIZE_INTRA/2/ 4)–1, and Max MtsInterSz=(MAX_MTS_SIZE_INTER/2/ 4)–1. In zero out determination, it is checked that there is no high frequency component of ½ or more of the transform size with respect to the horizontal axis and the vertical axis of the transform size. ¼ after ½ corresponds to the threshold in the subblock size (4×4). 1/2/4 may be replaced with ">>3", or may be a fixed value calculated in advance.

Further, in the intra prediction, in a case that the non-zero transform coefficient is used in a high frequency component region of ½ or more of the transform size, zero out determination may be omitted. In this case, in a case of the inter prediction, zero out determination (determination as to whether MtsZeroOutSigCoeffFlag=0 is set) may be performed, and otherwise (intra prediction), MtsZeroOutSig-CoeffFlag=1 may be set and zero out determination need not be performed. As illustrated in FIG. 13(*c*), in a case that the prediction mode is the inter prediction, the non-zero coefficient is present in the subblock, the subblock position is at a position larger than the prescribed position, and cIdx==0 (luma block), the RRC unit 30241 sets the variable MtsZe-roOutSigCoeffFlag equal to 0.

In other words, in a case that the prediction mode of the target block is the intra prediction, MtsZeroOutSigCoeffFlag indicating whether the TU is zeroed out is invariably 1, that is, (1-7) of MTS Conditions 1 is invariably true. On the other hand, in a case that the prediction mode of the target block is the inter prediction, as described above, the RRC unit 30241 derives the value of MtsZeroOutSigCoeffFlag, using the condition such as the subblock position. The CU decoder may decode mts_idx, using (1-7) of MTS Conditions 1 derived from the above.

According to the configuration described above, in the intra prediction block in which the effect of transform matrix selection (MTS) can be expected, mts_idx can be decoded in various block sizes, and various separable transforms can be applied. On the other hand, in the inter prediction block with a large block size in which the effect of MTS cannot be expected, mts_idx is not decoded. This produces an effect of enhancing coding efficiency with reduced complexity.

Example in Which MTS Conditions Are Different between Intra Prediction+CIIP Mode and Inter Prediction Other than CIIP Mode As the CIIP mode, the IntraInter combining unit 30951 generates a prediction image, using a weighted sum of an inter prediction image and an intra prediction image. In the CIIP mode, similarly to the intra prediction, a prediction residual is liable to occur, and thus MTS can be effectively used. The CU decoder 3022 may change a maximum block size in a case that MTS is applied depending on whether the prediction mode of the current block is the intra prediction, the CIIP mode, or the inter prediction other than the CIIP mode.

MTS Conditions 2

(2-1) sps_explicit_mts_inter_enabled_flag is 1, the prediction mode is the inter prediction other than the CIIP mode, and the CU size is equal to or smaller than MAX_MTS_SIZE_INTER (2-2) sps_explicit_mts_intra_enabled_flag is 1, the prediction mode is the intra prediction or the CIIP mode, and the CU size is equal to or smaller than MAX_MTS_ SIZE_INTRA The CU decoder 3022 may decode mts_idx, using the above conditions (FIG. 14(*a*)).

Only in a case of the inter prediction other than the CIIP mode, zero out determination (determination as to whether MtsZeroOutSigCoeffFlag=0 is set) may be performed, and otherwise (in a case of the CIIP mode or the intra prediction), MtsZeroOutSigCoeffFlag=1 may be set and zero out determination need not be performed. In other words, as illustrated in FIG. 14(*b*), in a case that the prediction mode is the inter prediction, the prediction mode is the CIIP mode, the non-zero coefficient is present in the subblock, the subblock position is at a position larger than the prescribed position, and cIdx==0, the RRC unit 30241 sets the variable MtsZeroOutSigCoeffFlag equal to 0.

In other words, in a case that the prediction mode of the target block is the intra prediction or the CIIP mode, MtsZeroOutSigCoeffFlag indicating whether the TU is zeroed out is invariably 1, that is, (1-7) of MTS Conditions 1 is invariably true. On the other hand, in a case that the prediction mode of the target block is the inter prediction other than the CIIP mode, as described above, the RRC unit 30241 derives the value of MtsZeroOutSigCoeffFlag, using the condition such as the subblock position. The CU decoder may decode mts_idx, using (1-7) of MTS Conditions 1 derived from the above.

Example of GPM Mode Using Intra Prediction

In the GPM mode, a prediction image is generated using a weighted sum of multiple inter prediction images. On the other hand, in the GPM mode, a prediction image may be generated using a weighted sum of an intra prediction image and an inter prediction image. In this case, in a case that ciip_flag[x0][y0] is 0, that is, the GPM mode is used, the CU decoder 3022 may decode merge_gpm_intra_flag0 and merge_gpm_intra_flag1. Each of merge_gpm_intra_flag0 and merge_gpm_intra_flag1 is a flag indicating whether each prediction image is derived using the intra prediction. Alternatively, one prediction image may be fixed as an inter prediction image, and a flag merge_gpm_intra_flag indicating whether another prediction image is derived using the intra prediction may be decoded.

In this case, the CU decoder 3022 may change the condition of the block size related to decoding of mts_idx, depending on whether a coding method of the current block is the intra prediction, the CIIP mode, the GPM mode using the intra prediction, and other inter prediction. In this case, a variable interUseIntra indicating whether the prediction mode is the CIIP mode or the GPM mode using the intra prediction may be derived as follows.

$interUseIntra =$ ciip_flag[*x*0][*y*0] | | merge_gpm_intra_flag0 | | merge_gpm_intra_flag1

Alternatively, derivation may be performed as follows.

$interUseIntra = $ ciip_flag[*x*0][*y*0] | | merge_gpm_intra_flag

MTS Conditions 2 may be as follows.

MTS Conditions 2

(2-1) sps_explicit_mts_inter_enabled_flag is 1, the prediction mode is the CIIP mode or the inter prediction other than the GPM mode using the intra prediction (CuPredMode[chType][x0][y0]==MODE_INTER && ! interUseIntra), and the CU size is equal to or smaller than MAX_MTS_SIZE_INTER (2-2) sps_explicit_mts_intra_enabled_flag is 1, the prediction mode is the intra prediction, the CIIP mode, or the GPM mode using the intra prediction (CuPredMode[chType][x0][y0]==MODE_INTER||interUseIntra), and the CU size is equal to or smaller than MAX_MTS_ SIZE_INTRA The CU decoder 3022 may decode mts_idx, using the above conditions (FIG. 14(*c*)).

Only in a case of the CIIP mode or the inter prediction other than the GPM mode using the intra prediction, zero out determination (determination as to whether MtsZeroOutSig-CoeffFlag=0 is set) may be performed, and otherwise (in a case of the CIIP mode, the GPM mode using the intra prediction, or the intra prediction), MtsZeroOutSigCoeffFlag=1 may be set and zero out determination need not be performed. In other words, as illustrated in FIG. 14(*d*), in a case that the prediction mode is the inter prediction, interUseIntra is 0, the non-zero coefficient is present in the subblock, the subblock position is at a position larger than the prescribed position, and cIdx==0, the RRC unit 30241 sets the variable MtsZeroOutSigCoeffFlag equal to 0.

In other words, in a case that the prediction mode of the target block is the intra prediction, the CIIP mode, or the GPM mode using the intra prediction, MtsZeroOutSigCoeffFlag indicating whether the TU is zeroed out is invariably 1, that is, (1-7) of MTS Conditions 1 is invariably true. On the other hand, in a case that the prediction mode of the target block is the CIIP mode, or the inter prediction other than the GPM mode using the intra prediction, as described above, the RRC unit 30241 derives the value of MtsZeroOutSigCoeffFlag, using the condition such as the subblock position. The CU decoder may decode mts_idx, using (1-7) of MTS Conditions 1 derived from the above.

According to the configuration described above, in a block in which the effect of transform matrix selection (MTS) can be expected, mts_idx can be decoded, and various separable transforms can be applied. On the other hand, in a block in which the effect of MTS cannot be expected, mts_idx is not decoded. This produces an effect of enhancing coding efficiency with reduced complexity.

As described above, in the present example, the block size for determining whether mts_idx is decoded is different depending on whether the prediction mode of the target block is the intra prediction or the inter prediction. Alternatively, the block size for decoding mts_idx is different between a case that the prediction mode of the target block is the intra prediction or the CIIP mode and a case that the prediction mode of the target block is the inter prediction other than the CIIP mode.

Other Example 3 of MTS Conditions

The syntaxes illustrated in FIG. 10 and FIG. 11 are intended to perform efficient coding through the following: in a case that the LAST position is a position of a DC component, it is considered that transform can be efficiently performed using DCT2 and mts_idx is not decoded. On the other hand, in a large block size, transform may be efficiently performed using DCT2 even in a case that the LAST position is not a position of a DC component.

As illustrated FIG. 15(*d*), the CU decoder 3022 of the present embodiment derives MtsCoeffStat as a variable indicating a state of the non-zero coefficient of the target block. As illustrated in SYN_CondMts of FIG. 15(*d*), the CU decoder 3022 decodes mts_idx in a case that the non-zero coefficient does not satisfy a prescribed condition (in a case that MtsCoeffStat==0). Note that a case that the non-zero coefficient does not satisfy a prescribed condition may be determined based on a case that the LAST position is larger than the prescribed position and a case that the number of non-zero transform coefficients is larger than the prescribed number. In a case that the LAST position is a position larger than the prescribed position, the CU decoder 3022 sets MtsCoeffStat equal to 0, and in a case that MtsCoeffStat==0 is satisfied, the CU decoder 3022 decodes mts_idx. In other words, in (1-8) of MTS Conditions 1 described above, mts_idx is decoded using the following condition of (1-8).

(1-8) The LAST position is a position larger than the prescribed position (MtsCoeffStat==0)

In the following, a method of deriving MtsCoeffStat will be described.

The RRC unit 30241 may derive MtsCoeffStat, depending on the TU size. For example, as illustrated in SYN_MtsLastPos of FIG. 15(*a*), in a case that the TU size is less than 16×16 (log 2TbWidth<4 && log 2TbHeight<4) and the LAST position (lastScanPos) is larger than 0, the RRC unit 30241 sets MtsCoeffStat equal to 0. lastScanPos>0 indicates that there is a non-zero coefficient other than a DC component. Alternatively, in a case that one of the width and the height of the TU size is equal to or larger than 16 (log 2TbWidth>=4||log 2TbHeight>=4), and lastScanPos is larger than 2, the RRC unit 30241 sets MtsCoeffStat equal to 0. lastScanPos>2 indicates that there is a non-zero coefficient other than a high frequency component. Note that log 2TbWidth and log 2TbHeight are logarithmic values of the width and the height of the TU size, respectively.

Alternatively, as illustrated in SYN_MtsLastPos of FIG. 15(*b*), the RRC unit 30241 may set a threshold lastScanPosTh for the LAST position used for derivation of Mts-CoeffStat depending on the TU size, and in a case that lastScanPos is larger than lastScanPosTh, the RRC unit

30241 may set MtsCoeffStat equal to 0. Here, the RRC unit 30241 may derive a larger value as lastScanPosTh as the TU size is larger.

$$lastScanPosTh = (\log2TbWidth < 4 \ \&\& \ \log2TbHeight < 4) \ ? \ 0{:}2$$

FIG. 15(*b*) is the same processing as FIG. 15(*a*).

Alternatively, as illustrated in SYN_MtsLastPos of FIG. 15(*c*), in a case that the TU size is equal to or larger than 16×16 (log 2TbWidth>=4 && log 2TbHeight>=4), and lastScanPos is larger than 2, the RRC unit 30241 sets MtsCoeffStat equal to 0. In a case that one of the width and the height of the TU size is less than 16 (log 2TbWidth<4||log 2TbHeight<4), and lastScanPos is larger than 0, MtsCoeffStat is set equal to 0. The RRC unit 30241 may change the method of deriving MtsCoeffStat according to the above configuration. Note that the TU size as a criterion for the change of the threshold for the LAST position is not limited to 16×16. The value of lastScanPosTh is not limited to 0 or 2 either. In general, derivation is performed as follows.

$$lastScanPosTh = (\log2TbWidth >= BlkSizeW \ \&\& \ \log2TbHeight >= BlkSizeH) \ ? \ PosTh1{:}PosTh2$$

For example, in the example of FIG. 15(*c*), BlkSizeW=4, BlkSizeH=4, PosTh1=2, and PosTh2=0.

As described above, in the present example, the video decoding apparatus determines whether to decode mts_idx, using the threshold for the LAST position, and the threshold is different depending on the block size. Particularly, the threshold is larger in a case that the block size is equal to or larger than the prescribed size than in a case that the block size is smaller than the prescribed size.

According to the configuration described above, at the LAST position at which the effect of transform matrix selection (MTS) can be expected, mts_idx can be decoded, and various separable transforms can be applied. On the other hand, at the LAST position at which the effect of MTS cannot be expected, mts_idx is not decoded. This produces an effect of enhancing coding efficiency.

Other Examples of Decoding of mts_idx

The following will describe a configuration in which the value range of mts_idx is changed depending on the block size and the prediction mode.

Configuration in Which Value Range of mts_idx is Changed Depending on Prediction Mode The CU decoder 3022 may decode mts_idx by changing the maximum value c Max of mts_idx, depending on whether the prediction mode is the intra prediction or the inter prediction, other than the LAST position.

For example, in a case that the prediction mode of the target block is the intra prediction, and lastScanPos is from IntraTH1 to IntraTH2, decoding may be performed using c Max=1 with the value range of mts_idx being 0 to 1. For example, IntraTH1 may be 1, and IntraTH2 may be 6. In a case that lastScanPos is larger than IntraTH2 and IntraTH3 or less, mts_idx may be decoded, using c Max=4 indicating 0 to 4. For example, IntraTH3 may be 32. Finally, in a case that lastScanPos is larger than IntraTH3, mts_idx may be decoded, using c Max=6 indicating 0 to 6.

On the other hand, in a case that the prediction mode of the target block is the inter prediction, similarly, in a case that lastScanPos is from InterTH1 to InterTH2, decoding may be performed using c Max=1 with the value range of mts_idx being 0 to 1. For example, InterTH1 may be 3, and InterTH2 may be 10. In a case that lastScanPos is larger than InterTH2 and InterTH3 or less, mts_idx may be decoded, using c Max=4 indicating 0 to 4. For example, InterTH3 may be 32. Finally, in a case that lastScanPos is larger than InterTH3, mts_idx may be decoded, using c Max=6 indicating 0 to 6.

Alternatively, in a case that the prediction mode of the target block is the inter prediction, and lastScanPos is from InterTH1 to InterTH2, decoding may be performed using c Max=1 with the value range of mts_idx being 0 to 1. For example, InterTH1 may be 3, and InterTH2 may be 10. In a case that lastScanPos is larger than InterTH2, mts_idx may be decoded, using c Max=4 indicating 0 to 4. In this manner, the number of thresholds for changing the value range of mts_idx may be different between a case that the prediction mode of the target block is the intra prediction and a case that the prediction mode of the target block is the inter prediction.

Note that the values of the thresholds IntraTH1, IntraTH2, and IntraTH3 and InterTH1, InterTH2, and InterTH3 for changing the value range of mts_idx are not limited to the above values. Some of the thresholds may be common. The parameter decoder 302 (CU decoder 3022) may decode the thresholds IntraTH1, IntraTH2, and IntraTH3 and InterTH1, InterTH2, and InterTH3 for changing the value range of mts_idx.

As described above, in the present example, the video decoding apparatus changes the value range of mts_idx or the maximum value c Max using multiple different thresholds between a case that the prediction mode of the target block is the intra prediction and a case that the prediction mode of the target block is the inter prediction.

Configuration in Which Value Range of mts_idx is Changed Depending on Block Size The CU decoder 3022 may decode mts_idx by changing the maximum value c Max of mts_idx depending on the block size of the target block, other than the LAST position.

For example, in a case that the TU size of the target block is smaller than the prescribed size and lastScanPos is from STH1 to STH2, decoding may be performed using c Max=1 with the value range of mts_idx being 0 to 1. For example, STH1 may be 1, and STH2 may be 6. In a case that lastScanPos is larger than STH2 and STH3 or less, mts_idx may be decoded, using c Max=4 indicating 0 to 4. For example, STH3 may be 32. Finally, in a case that lastScan-Pos is larger than STH3, mts_idx may be decoded, using c Max=6 indicating 0 to 6. The TU size being smaller than the prescribed size indicates that the width and the height of the TU size are smaller than the prescribed size (log 2TbWidth<BlkSizeW && log 2TbHeight<BlkSizeH). Alternatively, it indicates that the width or the height of the TU size is smaller than the prescribed size (log 2TbWidth<BlkSizeW||log 2TbHeight<BlkSizeH).

On the other hand, in a case that the TU size of the target block is equal to or larger than the prescribed size, similarly, in a case that lastScanPos is from LTH1 to LTH2, decoding may be performed using c Max=1 with the value range of mts_idx being 0 to 1. For example, LTH1 may be 3, and LTH2 may be 10. In a case that lastScanPos is larger than LTH2 and LTH3 or less, mts_idx may be decoded, using c Max=4 indicating 0 to 4. For example, LTH3 may be 32. Finally, in a case that lastScanPos is larger than LTH3, mts_idx may be decoded, using c Max=6 indicating 0 to 6.

Alternatively, in a case that the TU size of the target block is equal to or larger than the prescribed size, and lastScanPos is from LTH1 to LTH2, decoding may be performed using c Max=1 with the value range of mts_idx being 0 to 1. For example, LTH1 may be 3, and LTH2 may be 10. In a case that lastScanPos is larger than LTH2, mts_idx may be decoded, using c Max=4 indicating 0 to 4. In this manner, the number of thresholds for changing the value range of mts_idx may be different depending on the block size of the target block.

Note that the values of the thresholds STH1, STH2, and STH3 and LTH1, LTH2, and LTH3 for changing the value range of mts_idx are not limited to the above values. Some of the thresholds may be common. The parameter decoder 302 (CU decoder 3022) may decode the thresholds STH1, STH2, and STH3 and LTH1, LTH2, and LTH3 for changing the value range of mts_idx.

As described above, in the present example, the video decoding apparatus changes the value range of mts_idx or the maximum value c Max using multiple different thresholds between a case that the block size of the target block is equal to or smaller than the prescribed size and a case that the block size of the target block is smaller than the prescribed size.

Other Configuration in Which Value Range of mts_idx is Changed Depending on Block Size In a case that the TU size of the target block is equal to or larger than the prescribed size (log 2Tb Width>=BlkSizeW1 && log 2TbHeight>=BlkSizeH1), and lastScanPos is from LTH1 to LTH2, decoding may be performed using c Max=1 with the value range of mts_idx being 0 to 1. For example, LTH1 may be 3, and LTH2 may be 10. In a case that lastScanPos is larger than LTH2 and LTH3 or less, mts_idx may be decoded, using c Max=4 indicating 0 to 4. For example, LTH3 may be 32. Finally, in a case that lastScanPos is larger than LTH3, mts_idx may be decoded, using c Max=6 indicating 0 to 6. For example, BlkSizeW1=BlkSizeH1=4.

In a case other than the above, and that the TU size of the target block is equal to or larger than the prescribed size (log 2TbWidth>=BlkSizeW2 && log 2TbHeight>=BlkSizeH2), and lastScanPos is from MTH1 to MTH2, decoding may be performed using c Max=1 with the value range of mts_idx being 0 to 1. For example, MTH1 may be 1, and MTH2 may be 6. In a case that lastScanPos is larger than MTH2 and MTH3 or less, mts_idx may be decoded, using c Max=4 indicating 0 to 4. For example, MTH3 may be 32. Finally, in a case that lastScanPos is larger than MTH3, mts_idx may be decoded, using c Max=6 indicating 0 to 6. For example, BlkSizeW2=BlkSizeH2=3.

Further, in a case other than the above, and that lastScan-Pos is from STH1 to STH2, decoding may be performed using c Max=1 with the value range of mts_idx being 0 to 1. For example, STH1 may be 1, and LTH2 may be 3. In a case that lastScanPos is larger than STH2 and STH3 or less, mts_idx may be decoded, using c Max=4 indicating 0 to 4. For example, STH3 may be 32. Finally in a case that lastScanPos is larger than STH3, mts_idx may be decoded, using c Max=6 indicating 0 to 6.

Note that the values of the thresholds STH1, STH2, and STH3, MTH1, MTH2, and MTH3, and LTH1, LTH2, and LTH3 for changing the value range of mts_idx are not limited to the above values. Some of the thresholds may be common. The parameter decoder 302 (CU decoder 3022) may decode the thresholds STH1, STH2, and STH3, MTH1, MTH2, and MTH3, and LTH1, LTH2, and LTH3 for changing the value range of mts_idx.

As described above, in the present example, the video decoding apparatus changes the value range of mts_idx or the maximum value c Max using multiple different thresholds in a case of the block size of multiple target blocks.

Example Using Configuration in Which Value Range of mts_idx is Changed Only in Case of Intra Prediction The CU decoder 3022 may use a configuration in which the value range of mts_idx of the target block is changed only in a case that the prediction mode of the target block is the intra prediction. In other words, in a case that the prediction mode of the target block is the intra prediction, using the above method, the CU decoder 3022 decodes mts_idx by changing the value range of mts_idx or the maximum value c Max using multiple different thresholds. On the other hand, in a case that the prediction mode of the target block is the inter prediction, mts_idx is decoded using c Max=4 indicating 0 to 4, for example, with the value range of mts_idx being fixed.

Example of Decoding of mts_idx in Other Example 3 of MTS Conditions

The following will describe a configuration in which both of the method of deriving MtsCoeffStat and the value range of mts_idx are changed depending on the LAST position (the value of lastScanPos).

The CU decoder 3022 decodes mts_idx, using MtsCoeffStat derived using the above method. A configuration may be employed in which, in a case that lastScanPos is from TH1 to TH2, 0 to 1 (c Max=1) is used for decoding of mts_idx. For example, TH1 may be lastScanPosTh+1, and TH2 may be 6. In other words, in the present example, the thresholds (TH1, TH2, and TH3) for determining a possible value of mts_idx may be changed using the threshold variable (lastScanPosTh) of the LAST position depending on the TU size.

In the present example, the LAST position is located more on a high frequency component side in a case that the block size of the target block is equal to or larger than the prescribed size than in a case that the block size is smaller than the prescribed size. In other words, the LAST position for increasing the value of c Max is different depending on the block size.

Separable Transform Processing

The inverse separable transform processing unit 31123 applies the inverse separable transform to the coefficient (transform coefficient) transformed by the inverse non-separable transform processing unit 31121. The inverse separable transform processing unit 31123 may apply the inverse separable transform not to the transform coefficient output from the inverse non-separable transform processing unit 31121 but to the coefficient (transform coefficient) scaled by the scaling unit 31111. Note that the inverse separable transform processing unit 31123 may skip one or both of the vertical direction and the horizontal direction, and transform (scale) only the magnitude of the transform coefficient.

The inverse separable transform processing unit 31123 selects the transform matrices in the vertical direction and the horizontal direction out of multiple candidates. In a case of determining the transform matrix out of multiple candidates, there are explicit MTS and implicit MTS. In a case of explicit MTS, mts_idx is decoded from coded data, and the transform matrix is switched. In a case of implicit MTS, mts_idx is derived depending on the block size and whether it is the intra prediction, and the transform matrix is switched.

In a case that an MTS flag is enabled (sps_mts_enabled_flag==1) and <the intra subblock split is turned on, or the subblock transform flag is turned on, or it is the intra prediction with explicit MTS being turned off, and the non-separable transform is turned off and MIP prediction is turned off>, the inverse separable transform processing unit 31123 sets an implicit MTS flag (implicitMtsEnabled) equal to 1.

More specifically, in a case that one of the following conditions is satisfied, the inverse separable transform processing unit 31123 sets implicitMtsEnabled=1.

In a case that the intra subblock split is turned on (IntraSubPartitionsSplitType !=ISP_NO_SPLIT)

In a case that the subblock transform flag is turned on and the TU is equal to or smaller than the prescribed size (cu_sbt_flag==1 and Max (nTbW, nTbH)<=32)

1) The explicit MTS flag sps_explicit_mts_intra_en-abled_ flag is 0, 2) CuPredMode indicates the intra prediction, 3) lfnst_idx is 0, and 4) intra_mip_flag is 0

The inverse separable transform processing unit 31123 determines a transform matrix tyTypeHor in the horizontal direction and a transform matrix tyTypeVer in the vertical direction as follows.

(I) In a case that it is not the luminance (cIdx>0), or the intra subblock split is turned off and the non-separable transform is not used in the target block (IntraSubPartitionsSplitType !=ISP_NO_SPLIT and LfnstEnabled-Flag !=0), the inverse separable transform processing unit 31123 sets trTypeHor=trTypeVer=0 (=DCT2). In other words, MTS is not used.

(II) In a case other than the above, and implicit MTS is used (implicitMtsEnabled==1), the inverse separable transform processing unit 31123 sets tyTypeHor and tyTypeVer as follows.

(i) In a case that the subblock transform is used (cu_sbt_flag==1), tyTypeHor and tyTypeVer are set using cu_sbt_horizontal_flag and cu_sbt_pos_flag and the table illustrated in FIG. 12(*b*). Note that the numbers of 0, 1, and 2 in the table represent DCT2, DST7, and DCT8, respectively.

(ii) In a case other than the above (cu_sbt_flag==0), one of 0 (DCT2) and 1 (DST7) is set as tyTypeHor and tyTypeVer depending on the TU size (width nTbW and height nTbH).

$$trTypeHor = (nTbW >= 4\ \&\&\ nTbW <= 16)\ ?\ 1{:}0$$

$$trTypeVer = (nTbH >= 4\ \&\&\ nTbH <= 16)\ ?\ 1{:}0$$

Note that prescribed ranges are not limited to the above. For example, the following may be used.

$$trTypeHor = (nTbW >= 4 \ \&\& \ nTbW <= 8) \ ? \ 1{:}0$$

$$trTypeVer = (nTbW >= 4 \ \&\& \ nTbW <= 8) \ ? \ 1{:}0$$

(III) In a case further other than the above (in a case of explicit MTS), the inverse separable transform processing unit 31123 sets tyTypeHor and tyTypeVer, using mts_idx and the table illustrated in FIG. 12(*a*).

The inverse separable transform processing unit 31123 transforms a modified transform coefficient d[ ][ ] (for example, a transform coefficient subjected to the inverse non-separable transform) to an intermediate value e[ ][ ] through vertical one-dimensional transform, and clips e[ ] [ ]. The inverse separable transform processing unit 31123 transforms an intermediate value g[ ][ ] to a prediction residual r[ ][ ] through horizontal one-dimensional transform, and r[ ][ ] is transmitted to the addition unit 312.

More specifically, the inverse separable transform processing unit 31123 derives a first intermediate value e[x][y] according to the following expression.

$$e[x][y] \sum (transMatrix[y][j] \times d[x][j])$$

$$(j = 0 \ ... \ nTbS - 1)$$

Here, transMatrix[ ][ ] (=transMatrixV[ ][ ]) is a transform matrix of nTbS×nTbS derived using trTypeVer. nTbS is the height nTbH of the TU. In a case of 4×4 transform (nTbS=4) of trType==0 (DCT2), for example, transMatrix={{29, 55, 74, 84}{74, 74, 0, −74}{84, −29, −74, 55}{55, −84, 74, −29}} is used. The symbol Σ means processing of adding a product of the matrix transMatrix[y][j] and the transform coefficient d[x][j] regarding the suffix j of j=0 . . . nTbS−1. In other words, e[x][y] is obtained by arranging a column that is obtained by a product of a vector x[j] (j=0 . . . nTbS−1) including d[x][j] (j=0 . . . nTbS−1) being each column of d[x][y] and an element transMatrix[y][j] of the matrix.

The inverse separable transform processing unit 31123 clips the first intermediate value e[x][y], and derives a second intermediate value g[x][y], according to the following expression.

$$g[x][y] = Clip3(coefffMin, coeffMax, (e[x][y] + 64) >> 7)$$

64 and 7 in the above expression are numerical values determined by bit-depth of the transform matrix, and in the above expression, it is assumed that the transform matrix has 7 bits. coeff Min and coeff Max are a minimum value and a maximum value of clipping, respectively.

The inverse separable transform processing unit 31123 is a transform matrix transMatrix[ ][ ] (=transMatrixH[ ][ ]) of nTbS×nTbS derived using trTypeHor. nTbS is the height nTbH of the TU. A horizontal transform processing unit 152123 transforms an intermediate value g[x][y] to a prediction residual r[x][y] through horizontal one-dimensional transform.

$$r[x][y] \sum transMatrix[x][j] \times g[j][y]$$

$$(j = 0 \ ... \ nTbS - 1)$$

The above symbol Σ means processing of adding a product of the matrix transMatrix[x][j] and g[j][y] regarding the suffix j of j=0 . . . nTbS−1. In other words, r[x][y] is obtained by arranging a row that is obtained by a product of g[j][y] (j=0 . . . nTbS−1) being each row of g[x][y] and the matrix transMatrix.

The addition unit 312 adds the prediction image of the block input from the prediction image generation unit 308 and the prediction error input from the inverse quantization and inverse transform processing unit 311 for each pixel, and generates a decoded image of the block. The addition unit 312 stores the decoded image of the block in the reference picture memory 306, and also outputs it to the loop filter 305.

Configuration of Video Coding Apparatus

Figure 16:
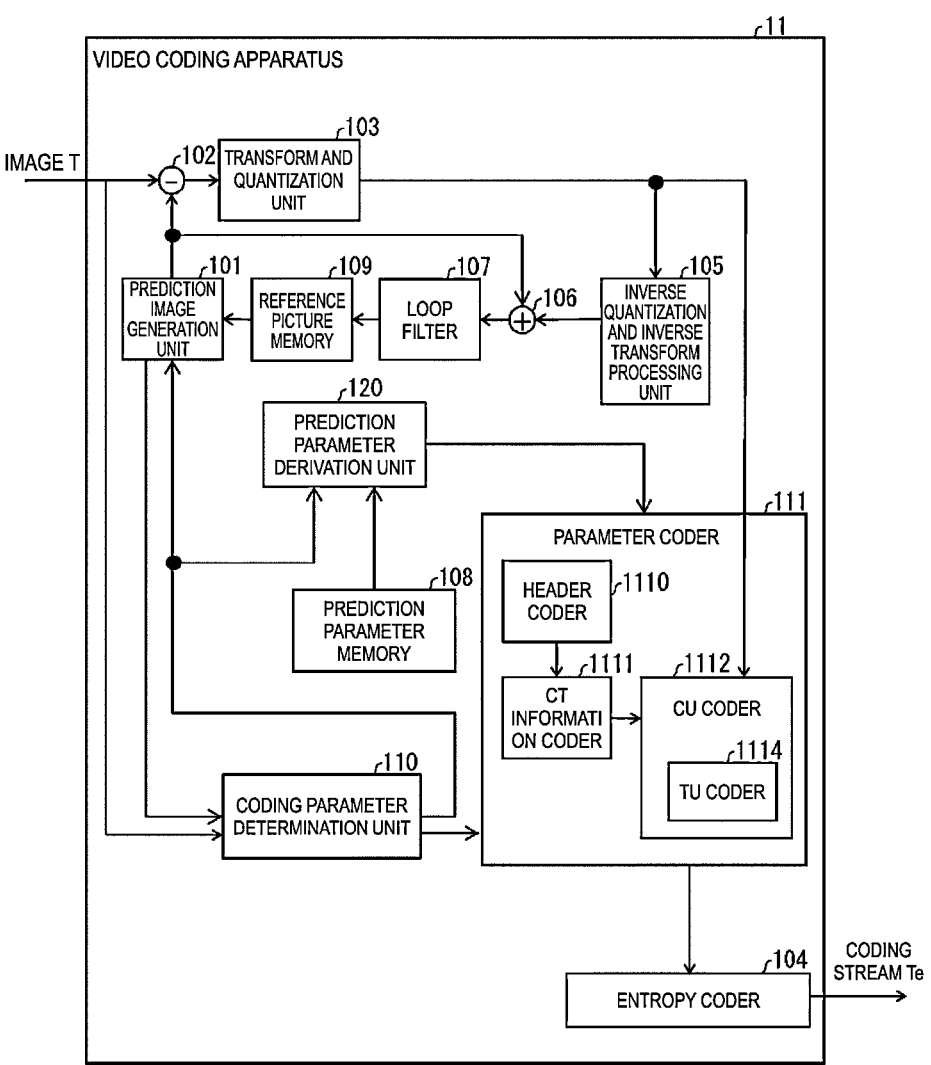
FIG. 16 is a block diagram illustrating a configuration of a video coding apparatus.

Next, a configuration of the video coding apparatus 11 according to the present embodiment will be described. FIG. 16 is a block diagram illustrating a configuration of the video coding apparatus 11 according to the present embodiment. The video coding apparatus 11 includes a prediction image generation unit 101, a subtraction unit 102, a transform and quantization unit 103, an inverse quantization and inverse transform processing unit 105, an addition unit 106, a loop filter 107, a prediction parameter memory (a prediction parameter storage unit or a frame memory) 108, a reference picture memory (a reference image storage unit or a frame memory) 109, a coding parameter determination unit 110, a parameter coder 111, a prediction parameter derivation unit 120, and an entropy coder 104.

The prediction image generation unit 101 generates a prediction image for each CU. The prediction image generation unit 101 includes the inter prediction image generation unit 309 and intra prediction image generation unit already described, and description of these units is omitted.

The subtraction unit 102 subtracts a pixel value of the prediction image of a block input from the prediction image generation unit 101 from a pixel value of the image T to generate a prediction error. The subtraction unit 102 outputs the prediction error to the transform and quantization unit 103.

The transform and quantization unit 103 performs a frequency transform on the prediction error input from the subtraction unit 102 to calculate a transform coefficient, and derives a quantized transform coefficient by quantization. The transform and quantization unit 103 outputs the quantized transform coefficient to the parameter coder 111 and the inverse quantization and inverse transform processing unit 105.

The transform and quantization unit 103 includes a separable transform processing unit (first transform processing unit), a non-separable transform processing unit (second transform processing unit), and a scaling unit.

The separable transform processing unit applies the separable transform to a prediction error. In a case that lfnst_idx is not 0, the non-separable transform processing unit performs the non-separable transform. The scaling unit performs scaling for a transform coefficient using a quantization matrix.

Specifically, the transform and quantization unit 103 performs the following processing.

S1: The separable transform processing unit performs the separable transform.

S2: The non-separable transform processing unit determines whether the non-separable transform is enabled (lfnst_idx !=0).

S3: In a case that the non-separable transform is enabled, the non-separable transform processing unit performs the non-separable transform (forward non-separable transform).

S3B: In a case that the non-separable transform is not enabled, the non-separable transform processing unit does not perform the non-separable transform (forward non-separable transform).

S4: The scaling unit performs scaling for a transform coefficient using a quantization matrix.

In the (forward) non-separable transform, processing substantially equivalent to the inverse non-separable transform is performed.

The inverse quantization and inverse transform processing unit 105 is the same as the inverse quantization and inverse transform processing unit 311 of the video decoding apparatus 31, and descriptions thereof are omitted. The calculated prediction error is output to the addition unit 106.

The parameter coder 111 includes a header coder 1110, a CT information coder 1111, and a CU coder 1112 (prediction mode coder). The CU coder 1112 further includes a TU coder 1114. General operation of each module will be described below.

The header coder 1110 performs coding processing of parameters such as header information, split information, prediction information, and quantized transform coefficients.

The CT information coder 1111 codes the QT and MT (BT, TT) split information and the like.

The CU coder 1112 codes the CU information, the prediction information, the split information, and the like.

In a case that a prediction error is included in the TU, the TU coder 1114 codes the QP update information and the quantization prediction error.

The CT information coder 1111 and the CU coder 1112 supplies, to the parameter coder 111, syntax elements such as the inter prediction parameters (predMode, merge_flag, merge_idx, inter_pred_idc, refIdxLX, mvp_LX_idx, and mvdLX), the intra prediction parameters, and the quantized transform coefficients.

The parameter coder 111 inputs the quantized transform coefficients and the coding parameters (split information and prediction parameters) to the entropy coder 104. The entropy coder 104 entropy-codes the quantized transform coefficients and the coding parameters to generate and output a coding stream Te.

The prediction parameter derivation unit 120 is a section including the inter prediction parameter coder 112 and the intra prediction parameter coder, and derives an intra prediction parameter and an intra prediction parameter from the parameters input from the coding parameter determination unit 110. The derived intra prediction parameter and intra prediction parameter are output to the parameter coder 111.

Configuration of Inter Prediction Parameter Coder

Figure 17:
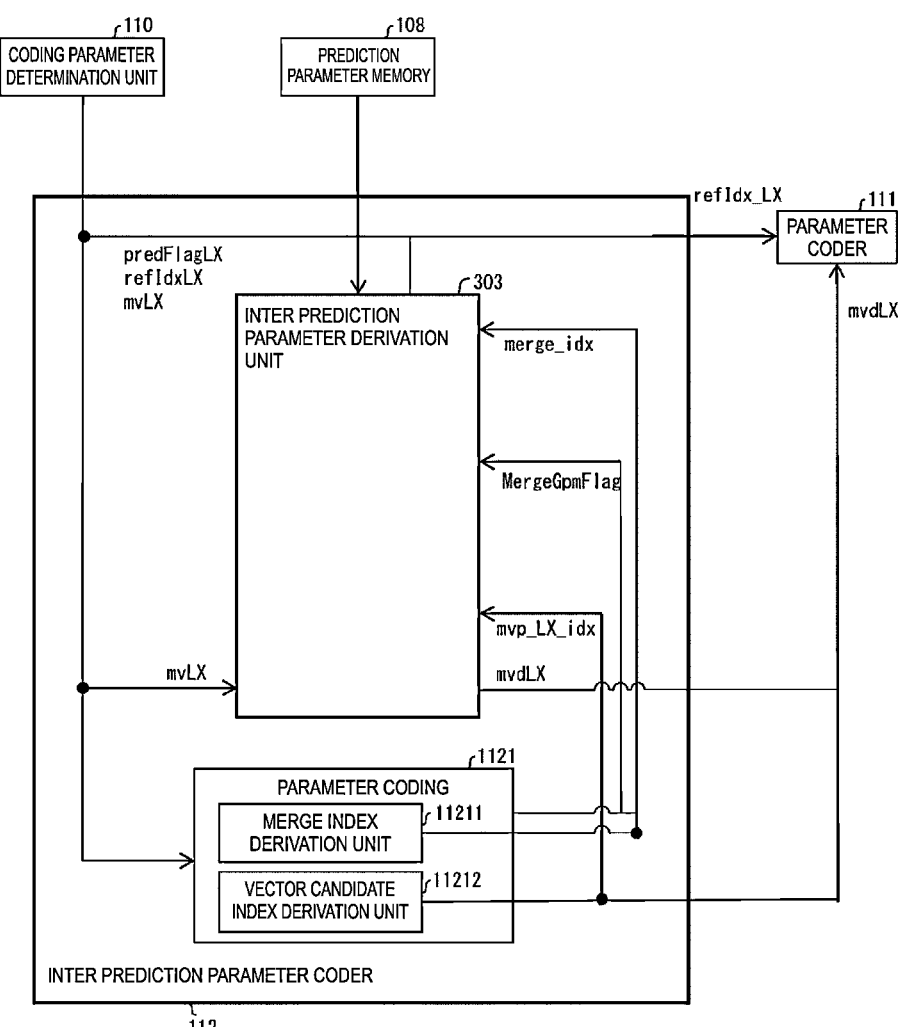
FIG. 17 is a schematic diagram illustrating a configuration of an inter prediction parameter coder.

The inter prediction parameter coder 112 includes a parameter coding controller 1121 and an inter prediction parameter derivation unit 303 as illustrated in FIG. 17. The inter prediction parameter derivation unit 303 has a configuration common to the video decoding apparatus. The parameter coding controller 1121 includes a merge index derivation unit 11211 and a vector candidate index derivation unit 11212.

The merge index derivation unit 11211 derives merge candidates and the like, and outputs the merge candidates and the like to the inter prediction parameter derivation unit 303. The vector candidate index derivation unit 11212 derives prediction vector candidates and the like, and outputs the prediction vector candidates and the like to the inter prediction parameter derivation unit 303 and the parameter coder 111.

Configuration of Intra Prediction Parameter Coder

The intra prediction parameter coder includes a parameter coding controller and an intra prediction parameter derivation unit. The intra prediction parameter derivation unit has a configuration common to the video decoding apparatus.

However, unlike in the video decoding apparatus, the coding parameter determination unit 110 and the prediction parameter memory 108 provide input to the inter prediction parameter derivation unit 303 and the intra prediction parameter derivation unit, and the input is output to the parameter coder 111.

The addition unit 106 adds together, for each pixel, a pixel value for the prediction block input from the prediction image generation unit 101 and a prediction error input from the inverse quantization and inverse transform processing unit 105, generating a decoded image. The addition unit 106 stores the generated decoded image in the reference picture memory 109.

The loop filter 107 applies a deblocking filter, an SAO, and an ALF to the decoded image generated by the addition unit 106. Note that the loop filter 107 need not necessarily include the above-described three types of filters, and may have a configuration of only the deblocking filter, for example.

The prediction parameter memory 108 stores the prediction parameters generated by the coding parameter determination unit 110 for each target picture and CU at a predetermined position.

The reference picture memory 109 stores the decoded image generated by the loop filter 107 for each target picture and CU at a predetermined position.

The coding parameter determination unit 110 selects one set among multiple sets of coding parameters. The coding parameters include QT, BT, or TT split information described above, a prediction parameter, or a parameter to be coded which is generated related thereto. The prediction image generation unit 101 generates the prediction image by using these coding parameters.

The coding parameter determination unit 110 calculates, for each of the multiple sets, an RD cost value indicating the magnitude of an amount of information and a coding error. The RD cost value is, for example, the sum of a code amount and the value obtained by multiplying a coefficient $\lambda$ by a square error. The code amount is an amount of information of the coding stream Te obtained by performing entropy coding on a quantization error and a coding parameter. The square error is the square sum of the prediction errors calculated in the subtraction unit 102. The coefficient $\lambda$ is a real number greater than a preset zero. The coding parameter determination unit 110 selects a set of coding parameters of which the calculated cost value is a minimum value. The coding parameter determination unit 110 outputs the determined coding parameters to the parameter coder 111 and the prediction parameter derivation unit 120.

Note that a computer may be used to implement some of the video coding apparatus 11 and the video decoding apparatus 31 in the above-described embodiments, for example, the entropy decoder 301, the parameter decoder 302, the loop filter 305, the prediction image generation unit 308, the inverse quantization and inverse transform processing unit 311, the addition unit 312, the prediction parameter derivation unit 320, the prediction image generation unit 101, the subtraction unit 102, the transform and quantization unit 103, the entropy coder 104, the inverse quantization and inverse transform processing unit 105, the loop filter 107, the coding parameter determination unit 110, a parameter coder 111, and the prediction parameter derivation unit 120. In that case, this configuration may be realized by recording a program for realizing such control functions on a computer-readable recording medium and causing a computer system to read and perform the program recorded on the recording medium. Note that the "computer system" described here refers to a computer system built into either the video coding apparatus 11 or the video decoding apparatus 31 and is assumed to include an OS and hardware components such as a peripheral apparatus. A "computer-readable recording medium" refers to a portable medium such as a flexible disk, a magneto-optical disk, a ROM, and a CD-ROM, and a storage apparatus such as a hard disk built into the computer system. Moreover, the "computer-readable recording medium" may include a medium that dynamically stores a program for a short period of time, such as a communication line in a case that the program is transmitted over a network such as the Internet or over a communication line such as a telephone line, and may also include a medium that stores the program for a certain period of time, such as a volatile memory included in the computer system functioning as a server or a client in such a case. The above-described program may be one for implementing a part of the above-described functions, and also may be one capable of implementing the above-described functions in combination with a program already recorded in a computer system.

A part or all of the video coding apparatus 11 and the video decoding apparatus 31 in the embodiment described above may be realized as an integrated circuit such as a Large Scale Integration (LSI). Each function block of the video coding apparatus 11 and the video decoding apparatus 31 may be individually realized as processors, or part or all may be integrated into processors. The circuit integration technique is not limited to LSI, and may be realized as dedicated circuits or a multi-purpose processor. In a case that, with advances in semiconductor technology, a circuit integration technology with which an LSI is replaced appears, an integrated circuit based on the technology may be used.

Although embodiments of the present invention have been described above in detail with reference to the drawings, the specific configurations thereof are not limited to those described above and various design changes or the like can be made without departing from the spirit of the invention.

Embodiments of the present invention are not limited to those described above and various changes can be made within the scope indicated by the claims. That is, embodiments obtained by combining technical means appropriately modified within the scope indicated by the claims are also included in the technical scope of the present invention.

INDUSTRIAL APPLICABILITY

The embodiment of the present invention can be preferably applied to a video decoding apparatus that decodes coded data in which image data is coded, and a video coding apparatus that generates coded data in which image data is coded. The embodiment of the present invention can be preferably applied to a data structure of coded data generated by the video coding apparatus and referred to by the video decoding apparatus.

CROSS-REFERENCE OF RELATED APPLICATION

The present application claims priority of JP 2021-196591, filed on Dec. 3, 2021, and all the contents thereof are included herein by the reference.

REFERENCE SIGNS LIST

31 Video decoding apparatus
301 Entropy decoder
302 Parameter decoder
3022 CU decoder
3024 TU decoder
30241 RRC unit
303 Inter prediction parameter derivation unit
305, 107 Loop filter
306, 109 Reference picture memory
307, 108 Prediction parameter memory
308, 101 Prediction image generation unit
309 Inter prediction image generation unit
311, 105 Inverse quantization and inverse transform processing unit
312, 106 Addition unit
320 Prediction parameter derivation unit
11 Video coding apparatus
102 Subtraction unit
103 Transform and quantization unit
104 Entropy coder
110 Coding parameter determination unit
111 Parameter coder
112 Inter prediction parameter coder
120 Prediction parameter derivation unit

The invention claimed is:

1. A video decoding apparatus for decoding a multiple transform selection (MTS) parameter in coded data, the video decoding apparatus comprising:
   a decoder that decodes a syntax element for the MTS, wherein
   the syntax element indicates a transform matrix to be applied to a target block,
   a maximum value used to decode the syntax element is determined according to whether or not a prediction mode of the target block is an intra prediction mode and according to a parameter,
   in a case of the intra prediction mode, the maximum value used to decode the syntax element is determined from at least two or more different maximum values based on a value of the parameter, and
   in a case of an inter prediction mode, a maximum value used to decode the syntax element is a fixed value.

2. The video decoding apparatus according to claim 1, wherein the at least two or more different maximum values include (i) the maximum value equal to one, (ii) the maximum value equal to four, and (iii) the maximum value equal to six.

3. A video coding apparatus for coding a multiple transform selection (MTS) parameter in data, the video coding apparatus comprising:

a coder that codes a syntax element for the MTS, wherein the syntax element indicates a transform matrix to be applied to a target block, a maximum value used to code the syntax element is determined according to whether or not a prediction mode of the target block is an intra prediction mode and according to a parameter, in a case of the intra prediction mode, the maximum value used to decode the syntax element is determined from at least two or more different maximum values based on a value of the parameter, and in a case of an inter prediction mode, a maximum value used to decode the syntax element is a fixed value.

4. A video encoding method for encoding a multiple transform selection (MTS) parameter, the video encoding method including:

encoding a syntax element for the MTS, wherein the syntax element indicates a transform matrix to be applied to a target block, a maximum value used to encode the syntax element is determined according to whether or not a prediction mode of the target block is an intra prediction mode and according to a parameter, in a case of the intra prediction mode, the maximum value used to encode the syntax element is determined from at least two or more different maximum values based on a value of the parameter, and, and in a case of an inter prediction mode, a maximum value used to encode the syntax element is a fixed value.

* * * * *